US012298696B2

(12) United States Patent
Kawamoto et al.

(10) Patent No.: US 12,298,696 B2
(45) Date of Patent: May 13, 2025

(54) IMAGE FORMING APPARATUS

(71) Applicant: CANON KABUSHIKI KAISHA, Tokyo (JP)

(72) Inventors: Takahiro Kawamoto, Kanagawa (JP); Hideo Kihara, Kanagawa (JP); Nobuo Oshima, Tokyo (JP); Takashi Mukai, Kanagawa (JP); Takuya Kitamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/520,798

(22) Filed: Nov. 28, 2023

(65) Prior Publication Data

US 2024/0231266 A1 Jul. 11, 2024

(30) Foreign Application Priority Data

Jan. 11, 2023 (JP) ................................ 2023-002751

(51) Int. Cl.
*G03G 15/00* (2006.01)
*G03G 15/08* (2006.01)

(52) U.S. Cl.
CPC ....... *G03G 15/553* (2013.01); *G03G 15/0865* (2013.01)

(58) Field of Classification Search
CPC ............. G03G 15/553; G03G 15/0865; G03G 2221/1654; G03G 15/556; G03G 21/1676
See application file for complete search history.

(56) References Cited

U.S. PATENT DOCUMENTS

2020/0218173 A1* 7/2020 Mochizuki ......... G03G 15/0865
2020/0292959 A1* 9/2020 Saeki ................. G03G 21/1676

FOREIGN PATENT DOCUMENTS

JP 2016-161645 A 9/2016
JP 2021-107869 A 7/2021
JP 2022-047646 A 3/2022

OTHER PUBLICATIONS

Takashi Mukai et al., U.S. Appl. No. 18/401,801, filed Jan. 2, 2024.

* cited by examiner

*Primary Examiner* — Sandra Brase
(74) *Attorney, Agent, or Firm* — VENABLE LLP

(57) ABSTRACT

An image forming apparatus includes a moving unit to move a developing roller, a driving portion to be capable of rotating the developing roller in either case where the developing roller is located in a contact position in contact with a photosensitive drum or a separated position separated from the photosensitive drum, an acquiring portion to acquire information on a rotation amount of the developing roller and a notifying portion. The acquiring portion corrects a first information, on the rotation amount of the developing roller in the contact position, to a third information by using a first correction coefficient, and corrects a second information, on the rotation amount of the developing roller in the separated position, to a fourth information by using a second correction coefficient. The notifying portion performs the notification on a lifetime of the developing roller based on the third and the fourth information.

13 Claims, 11 Drawing Sheets

IMAGE FORMING APPARATUS

FIELD OF THE INVENTION AND RELATED ART

The present invention relates to an image forming apparatus such as a copy machine, a printer, a facsimile machine, or a multifunction machine provided with several of these functions, using an electrophotographic or electrostatic recording method.

In the image forming apparatus using the electrophotographic method, etc. an image formation is performed by an electrostatic latent image formed on a surface of an image bearing member being developed by developer supplied by a developer carrying member of a developing device (unit). In addition, the image forming apparatus using a contact developing method, in which the developing operation is performed while the developer carrying member is in contact with the image bearing member, is known. As the image bearing member, a rotatable photosensitive drum is often used.

The developing device of the contact developing method is generally provided with a rotatable developing roller as the developer carrying member, a regulating blade as a regulating member, and a rotatable supplying roller as a supplying member. Toner as the developer is carried and conveyed by the supplying roller, and is supplied to a surface of the developing roller in a contact portion between the supplying roller and the developing roller. The toner on the developing roller is frictionally charged and a layer thickness of the toner is regulated in a contact portion with the regulating blade, and then adheres to an image portion of the electrostatic latent image formed on a surface of the photosensitive drum in a contact portion with the photosensitive drum to develop the electrostatic latent image. In addition, the toner that is not supplied to the development is scraped from the surface of the developing roller in the contact portion between the developing roller and the supplying roller and is collected into the developing device.

In Patent Application Laid-Open No. 2016-161645, a configuration which corrects a detected result of a rotation amount of the developing roller in consideration of a degree of deterioration of the toner corresponding to a toner remaining amount in the developing device, and based on the corrected result, determines that the developing device has reached an end of lifetime thereof (here, also referred to as a "lifetime determination") is disclosed.

By the way, the image forming apparatus using the contact developing method may be configured to be provided with a contact/separation mechanism (unit) which makes the developing roller be in contact with and separated from the photosensitive drum. Incidentally, a state in which the developing roller is in contact with the photosensitive drum is also called as a "development contact state", and a state in which the developing roller is separated from the photosensitive drum is also called as a "development separated state". And such an image forming apparatus may be configured so that the developing roller is driven and rotated in the development separated state.

However, in the prior art, the rotation amount of the developing roller is integrated in the same way regardless of whether the developing roller is in the development contact state or the development separated state. Therefore, for example, the lifetime determination may be performed earlier than when a filming status of the developing roller due to the degree of the toner deterioration reaches a threshold value. As a result, a notification that the developing device has reached the end of the lifetime thereof (here, also referred to as a "lifetime notification") to a user may not be able to perform appropriately.

SUMMARY OF THE INVENTION

Therefore, an object of the present invention is to perform an appropriate lifetime notification of the developing unit in a configuration in which the developer carrying member is driven and rotated in the development separated state.

The above object is achieved with an image forming apparatus according to the present invention. In summary, the present invention provides an image forming apparatus comprising: an image bearing member configured to bear a developer image; a developing unit provided with a developer carrying member configured to rotate while carrying a developer and to form the developer image on the image bearing member by supplying the developer to the image bearing member; a moving unit configured to move the developer carrying member to a first position where the developer carrying member and the image bearing member are in contact with each other and to a second position which is further away from the image bearing member than the first position; a driving portion configured to be capable of rotating the developer carrying member in either case where the developer carrying member is located in the first position or the second position; an acquiring portion configured to acquire information including first information and second information on a rotation amount of the developer carrying member; and a notifying portion configured to perform a notification on a lifetime of the developing unit, wherein the acquiring portion corrects the first information, on the rotation amount of the developer carrying member in a state in which the developer carrying member is located in the first position, to a third information by using a first correction coefficient, and corrects the second information, on the rotation amount of the developer carrying member in a state in which the developer carrying member is located in the second position, to a fourth information by using a second correction coefficient different from the first correction coefficient, and wherein the notifying portion performs the notification on the lifetime of the developing unit based on the third information and the fourth information.

Further features of the present invention will become apparent from the following description of exemplary embodiments with reference to the attached drawings.

DESCRIPTION OF THE EMBODIMENTS

Hereinafter, Embodiments of an image forming apparatus according to the present invention will be described in more detail in accordance with the drawings. However, dimensions, materials, shapes, relative arrangement, etc. of components described in the Embodiments should be changed appropriately according to a configuration and various conditions of a device to which the present invention is applied. In other words, the scope of the present invention is not limited to the Embodiments hereinafter.

<Overall Configuration of an Image Forming Apparatus and an Image Forming Operation>

Figure 1:
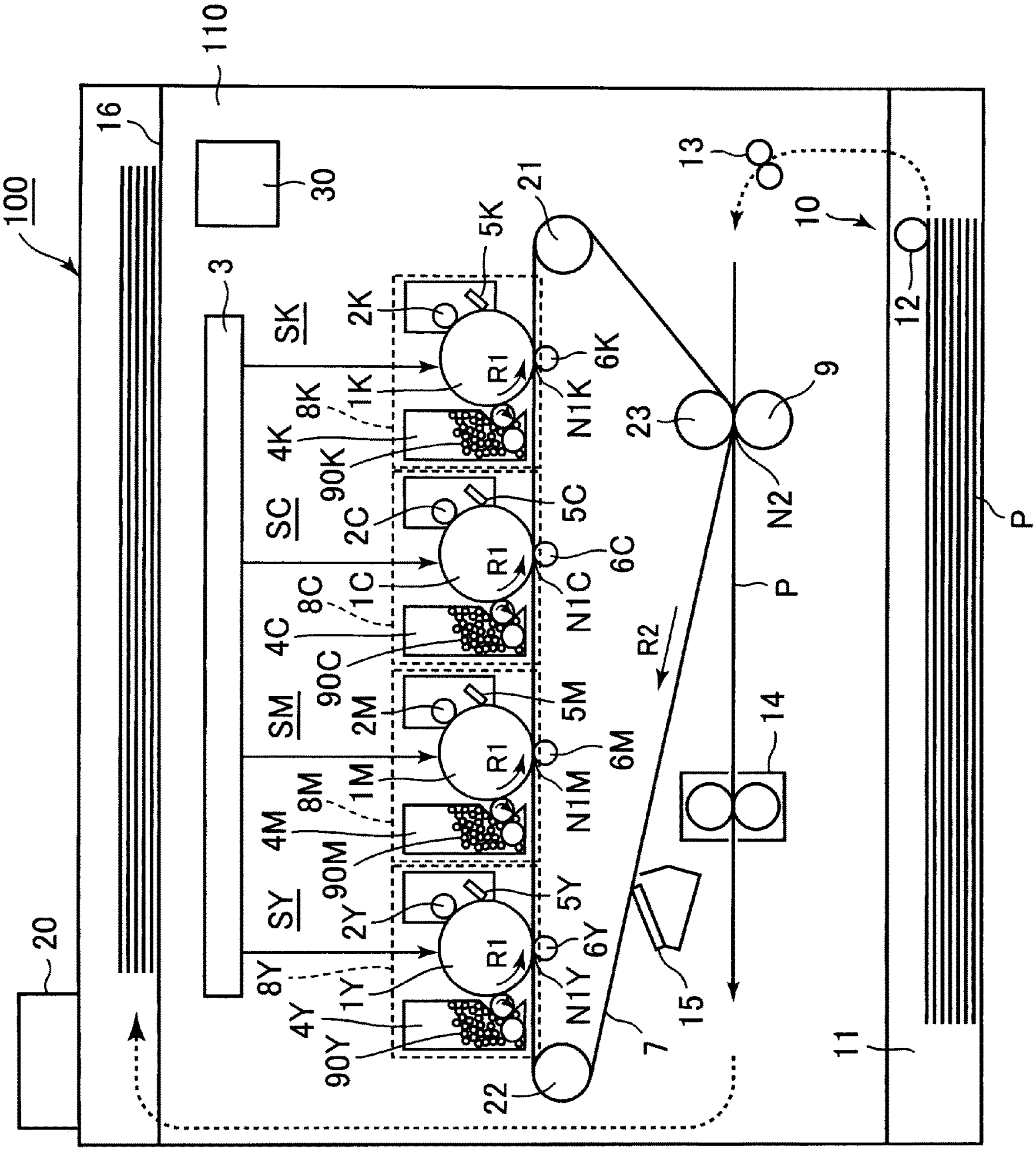
FIG. 1 is a schematic cross-sectional view of an image forming apparatus.

With reference to FIG. 1, an overall configuration of an image forming apparatus 100 and an image forming operation of an Embodiment 1 will be described. FIG. 1 is a schematic cross-sectional view of the image forming apparatus 100 of the Embodiment 1. In the Embodiment 1, the image forming apparatus 100 is a laser beam printer of a tandem-type adopting an intermediary transfer method, which is capable of a formation of a full color image using an electrophotographic method.

Figure 2:
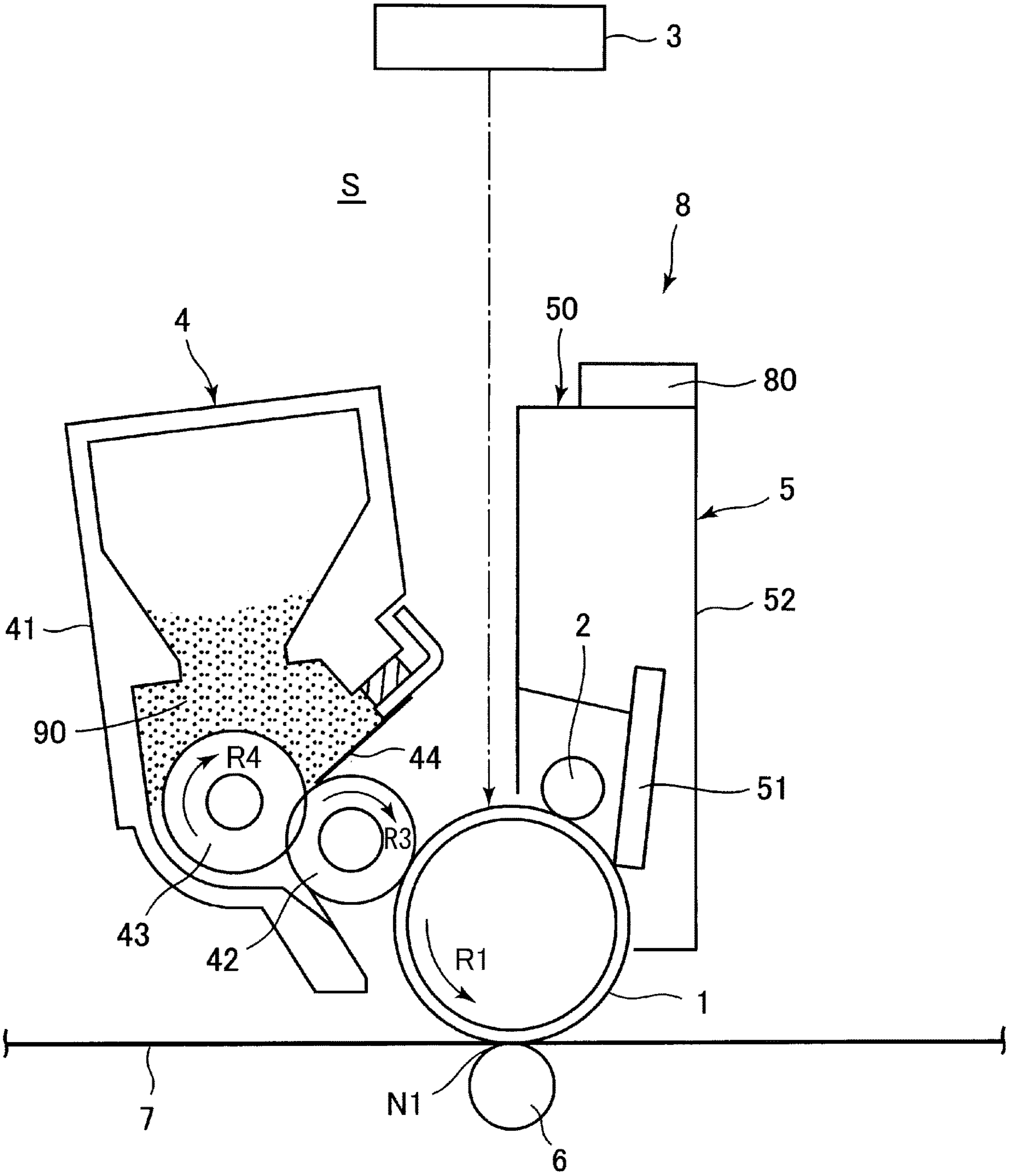
FIG. 2 is a schematic cross-sectional view of an image forming portion.

The image forming apparatus 100 includes four image forming portions (stations) SY, SM, SC and SK as a plurality of the image forming portions, which form images of each color in yellow (Y), magenta (M), cyan (C) and black (K). Elements which are provided with the same or corresponding function or configuration for each color may be described collectively by omitting end of reference numerals, Y, M, C and K, which indicate the element is one of the colors. FIG. 2 is a schematic cross-sectional view illustrating the image forming portion S in more detail. In the Embodiment 1, the image forming portion S is constituted by a photosensitive drum 1, a charging roller 2, an exposure device 3, a developing device 4, a primary transfer roller 6, a drum cleaning device 5, etc. as described below. The exposure device 3 is configured, in the Embodiment 1, as a common single unit to each image forming portion S, however, the exposure devices 3 may be provided to each image forming portion S.

The photosensitive drum 1, which is a rotatable drum-shaped (cylindrical) photosensitive member (electrophotographic photosensitive member) as an image bearing member, is driven and rotated in a direction of an arrow R1 (counterclockwise direction) in FIG. 2 about a rotation shaft thereof by driving force being transmitted from a driving motor 127 (FIG. 4), which is an image bearing member driving portion as a driving means. In the Embodiment 1, the photosensitive drum 1 is driven and rotated at a rotation speed where a moving speed (peripheral speed) of a surface (outer peripheral surface) thereof is, for example, 140 mm/sec.

The surface of the rotating photosensitive drum 1 is uniformly charged to predetermined potential of predetermined polarity (negative polarity in the Embodiment 1) by the charging roller 2, which is a roller-shaped charging member as a charging means.

In the Embodiment 1, the charging roller 2 is a conductive roller provided with a conductive rubber layer on a core metal, disposed in contact with the photosensitive drum 1 with predetermined pressure, and rotatably driven by the rotation of the photosensitive drum 1. During an image formation (charging process), predetermined charging voltage (charging bias) is applied to the charging roller 2 by a charging power source 121 (FIG. 4) as a charging voltage applying means (charging voltage applying portion). In the Embodiment 1, for example, direct current voltage of −1150 V is applied to the charging roller 2 during the image formation (charging process), and surface potential of the photosensitive drum 1 becomes approximately −500 V.

The surface of the photosensitive drum 1 on which the changing process is performed is scanned and exposed to laser beam corresponding to an image signal (image information) of the color component which corresponds to each image forming portion S by the exposure device (exposure unit) 3 to form an electrostatic latent image (electrostatic image) on the photosensitive drum 1 corresponding to the image signal. The image signal is input to the image forming apparatus 100, for example, from an image reading apparatus (not shown) connected to an apparatus main body 110 of the image forming apparatus 100 according to a request of a user (an operator). Alternatively, the image signal is input to the image forming apparatus 100, for example, from host devices (external devices) (not shown) such as personal computers connected communicably to the apparatus main body 110, according to the request of the user.

The electrostatic latent image formed on the photosensitive drum 1 is developed (visualized) by toner 90 as developer being supplied by the developing device 4 as a developing means to form a toner image (developer image) on the photosensitive drum 1. In the Embodiment 1, the developing device 4 adheres the toner 90 charged with the same polarity as the charging polarity of the photosensitive drum 1 (negative polarity in the Embodiment 1) to a portion (image portion, exposed portion) on the surface of the photosensitive drum 1, which is once uniformly charged and then an absolute value of the potential thereof is decreased due to the exposure (reverse development method). In the Embodiment 1, the developing device 4 uses the toner 90, which is a non-magnetic one-component developer and of which normal charging polarity (charging polarity for developing the electrostatic latent image) is negative polarity, as the developer. The developing device 4 will be described in more detail below.

An intermediary transfer belt 7, which is constituted by an endless belt as an intermediary transfer member, is disposed so as to be opposite to the four photosensitive drums 1. The intermediary transfer belt 7 is extended around a driving roller 21, a tension roller 22 and a secondary transfer opposite roller 23, as a plurality of stretching rollers, and is stretched at a predetermined tensile force. The intermediary transfer belt 7 rotates in a direction of an arrow R2 (clockwise direction) in FIG. 1 as the driving roller 21 is driven and rotated by a belt driving motor 129 (FIG. 4), which is an intermediary transfer member driving portion as a driving means. The intermediary transfer belt 7 rotates at a rotation speed where a moving speed (peripheral speed) of a surface (outer peripheral surface) thereof is approximately the same as the moving speed (peripheral speed) of the surface (outer peripheral surface) of the photosensitive drum 1. On an inner peripheral surface side of the intermediary transfer belt 7, primary transfer rollers 6Y, 6M, 6C and 6K, which are roller-shaped primary transfer members as primary transfer means, are disposed corresponding to each of the photosensitive drums 1Y, 1M, 1C and 1K. The primary transfer roller 6 is pressed toward the photosensitive drum 1 via the intermediary transfer belt 7 and forms a primary transfer portion (primary transfer nip portion) N1, which is a contact portion between the photosensitive drum 1 and the intermediary transfer belt 7. The toner image formed on the photosensitive drum 1 is electrostatically transferred (primary transfer) onto the intermediary transfer belt 7, as a rotating transferred member, by an action of the primary transfer roller 6 in the primary transfer portion N1.

During the image formation (primary transfer), predetermined primary transfer voltage (primary transfer bias), which is direct current voltage of opposite polarity to the normal charging polarity of the toner 90, is applied to the primary transfer roller 6 by a primary transfer power source 125 (FIG. 4) as a primary transfer voltage applying means (primary transfer voltage applying portion). For example, in a full-color image formation, toner images of each color of YMCK formed on each photosensitive drum 1 is sequentially transferred to the intermediary transfer belt 7 so as to be overlapped one after another.

On an outer peripheral surface side of the intermediary transfer belt 7, a secondary transfer roller 9, which is a roller-shaped secondary transfer member as a secondary transfer means, is disposed at a position opposite to the secondary transfer opposite roller 23. The secondary transfer roller 9 is pressed toward the secondary transfer opposite roller 23 via the intermediary transfer belt 7 and forms a secondary transfer portion (secondary transfer nip portion) N2, which is a contact portion between the intermediary transfer belt 7 and the secondary transfer roller 9. The toner image formed on the intermediary transfer belt 7 is transferred onto a recording material P, such as a recording paper or a plastic sheet as a transferred member, which is being nipped and conveyed by the intermediary transfer belt 7 and the secondary transfer roller 9 by an action of the secondary transfer roller 9 in the secondary transfer portion N2 (secondary transfer). During the image formation (secondary transfer), predetermined secondary transfer voltage (secondary transfer bias), which is direct current voltage opposite to the normal charging polarity of the toner 90, is applied to the secondary transfer roller 9 by a secondary transfer power source 126 (FIG. 4) as a secondary transfer voltage applying means (secondary transfer voltage applying portion). The recording material P is accommodated in a cassette 11 as a recording material accommodating portion of a feeding portion 10. The recording material P in the cassette 11 is separated and fed out of the cassette 11 one by one by a feeding roller 12, etc. as a feeding member of the feeding portion 10. The recording material P is conveyed to the secondary transfer portion N2 by a conveyance roller (registration roller) 13 as a conveyance member, so that a timing is matched with the toner image on the intermediary transfer belt 7.

The recording material P onto which the toner image has been transferred is conveyed to a fixing device 14 as a fixing means. The fixing device 14 fixes (melts and solidifies) the toner image onto the recording material P by pressing and heating the toner image on the recording material P in a process in which the recording material P carrying the unfixed toner image is nipped and conveyed by a fixing roller pair. The recording material P on which the toner image is fixed is discharged (output) onto a tray 16 as a discharge portion, which is provided outside of the apparatus main body 110, as an image formed product.

On the other hand, the toner 90 remaining on the photosensitive drum 1 after the primary transfer (remaining toner of the primary transfer) is removed from the photosensitive drum 1 and collected by the drum cleaning device 5 as an image bearing member cleaning means. The drum cleaning device 5 is provided with a cleaning blade 51 as a cleaning member disposed in contact with the surface of the photosensitive drum 1 and a cleaning container 52 (FIG. 2). The drum cleaning device 5 scrapes the remaining toner of the primary transfer from the surface of the rotating photosensitive drum 1 by the cleaning blade 51 and accommodates the scraped toner in the cleaning container 52. In addition, a belt cleaning device 15 as an intermediary transfer member cleaning means is disposed on the outer peripheral surface side of the intermediary transfer belt 7. The belt cleaning device 15 is disposed downstream of the secondary transfer portion N2 and upstream of the primary transfer portion (uppermost primary transfer portion N1Y) in the rotational direction of the intermediary transfer belt 7 (movement direction of the surface). The toner 90 remaining on the intermediary transfer belt 7 after the secondary transfer (remaining toner of the secondary transfer) and adhered materials such as paper dust, which are adhered on the intermediary transfer belt 7 during the secondary transfer, are removed from the intermediary transfer belt 7 and collected by the belt cleaning device 15. However, the image forming apparatus 100 is not limited to this configuration. For example, the image forming apparatus 100 may be configured so that no dedicated cleaning means is provided with the photosensitive drum 1 for cleaning, and it may be configured that the remaining toner of the primary transfer is collected by the developing device 4 (cleanerless method).

As shown in FIG. 2, in the Embodiment 1, in each image forming portion S, the photosensitive drum 1 and the charging roller 2, the developing device 4 and the drum cleaning device 5, as process means acting onto the photosensitive drum 1, are integrated as a process cartridge 8. The process cartridge 8 is attachable to and removable from the apparatus main body 110. Incidentally, the apparatus main body 110 is a part of the image forming apparatus 100 excluding the process cartridges 8. However, the image forming apparatus 100 is not limited to this configuration. For example, the image forming apparatus 100 may have a configuration in which the developing device 4 is configured as a cartridge (developing cartridge) which is attachable to and removable from the apparatus main body 110 substantially solely. In the Embodiment 1, the process cartridge 8 is constituted by a drum unit 50 and the developing device (developing unit) 4 being connected to each other. The drum unit 50 is provided with the photosensitive drum 1, the charging roller 2 and the drum cleaning device 5. The photosensitive drum 1 and the charging roller 2 are rotatably supported by the cleaning container (frame member) 52, which constitutes the drum cleaning device 5, respectively. In addition, the cleaning container 52 supports the cleaning blade 51.

<Developing Device>

Next, the developing device 4 in the Embodiment 1 will be described.

Figure 4:
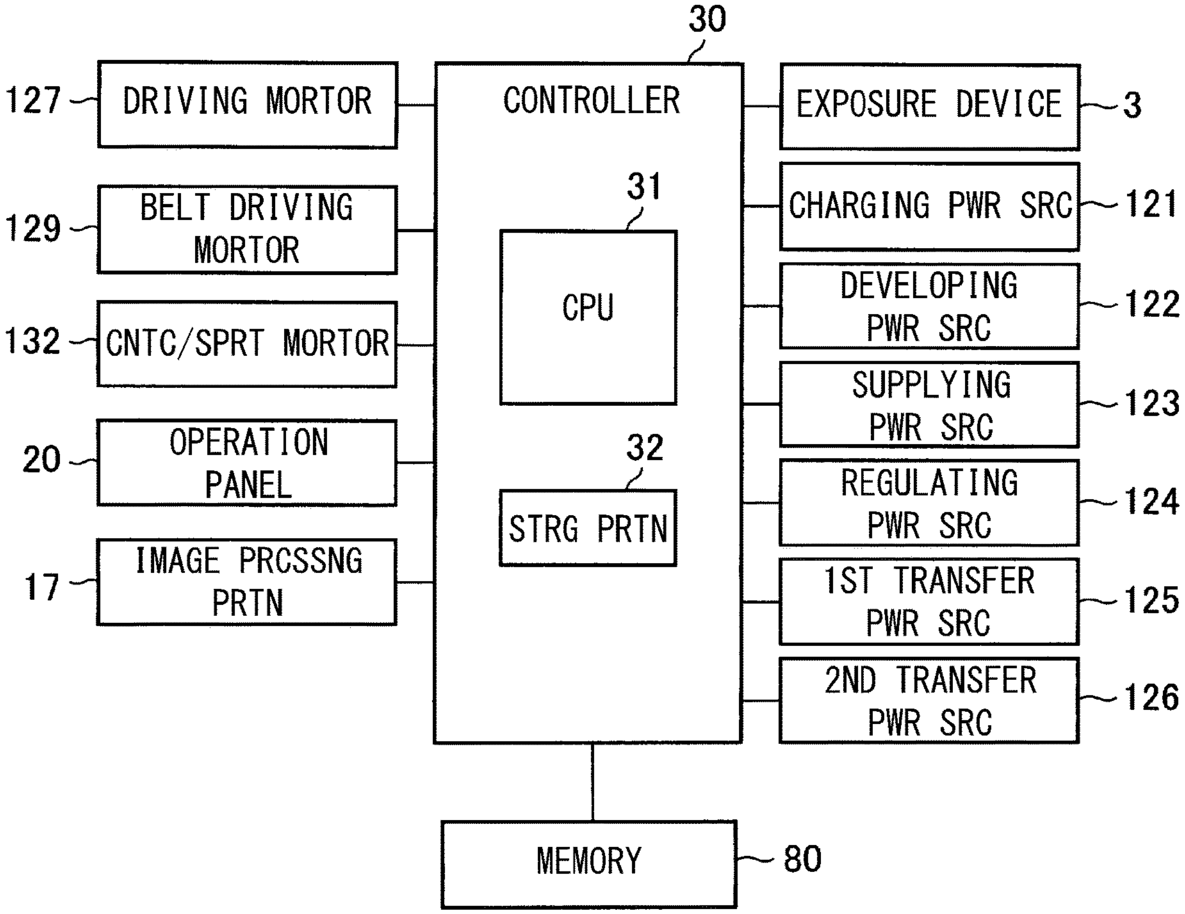
FIG. 4 is a block diagram illustrating an outline of a control mode of the image forming apparatus.

As shown in FIG. 2, the developing device 4 is provided with a rotatable developing roller 42 as a developer carrying member (developing member), a rotatable supplying roller 43 as a supplying member, a regulating blade 44 as a regulating member and a developer container (frame body) 41 which accommodates the toner 90. The developing roller 42 contacts the surface of the photosensitive drum 1 to form the developing portion, and supplies the toner 90 charged with the normal charging polarity to the electrostatic latent image on the photosensitive drum 1 in the developing portion. The developing roller 42 and the supplying roller 43 are rotatably supported by the developer container 41, respectively. The developing roller 42 is driven and rotated in a direction of an arrow R3 (clockwise direction) in FIG. 2 by a driving force being transmitted from the driving motor 127 (FIG. 4), which is common to the photosensitive drum 1. Similarly, the supplying roller 43 is driven and rotated in a direction of an arrow R4 (clockwise direction) in FIG. 2 by a driving force being transmitted from the driving motor 127 (FIG. 4).

In the Embodiment 1, when the developing roller 42 is driven and rotated, the supplying roller 43 is also driven and rotated. In other words, the developing roller 42 is driven and rotated so that movement directions of the surfaces of the photosensitive drum 1 and the developing roller 42 are in a forward direction in an opposing portion (contact portion) with the photosensitive drum 1. In addition, the supplying roller 43 is driven and rotated so that the movement direction of the surface of the developing roller 42 and a movement direction of a surface of the supplying roller 43 are opposite directions in an opposing portion (contact portion) with the developing roller 42.

In the developing device 4, the toner 90 is supplied to the surface of developing roller 42 by the supplying roller 43. And the toner 90 held (carried) on the developing roller 42 is made into a thin layer as a layer thickness (thickness of a toner layer) and is regulated by the regulating blade 44. Here, the regulating blade 44 has a function for regulating the layer thickness of the toner 90 on the developing roller 42 and also a function for imparting predetermined electric charge to the toner 90 on the developing roller 42. The thin-layered toner 90 is conveyed to the contact portion with the photosensitive drum 1 as the developing roller 42 rotates, and develops the electrostatic latent image formed on the surface of the photosensitive drum 1. In addition, the toner 90 remaining on the developing roller 42 without being supplied to the development is removed from the developing roller 42 in the contact portion with the supplying roller 43. The toner 90 removed from the developing roller 42 is then agitated and mixed with the toner 90 in the developer container 41.

The developing roller 42 is constituted by a conductive elastic rubber layer, which has predetermined volume resistance, on an outer periphery of a core metal, and the surface thereof has a predetermined surface roughness. As the developing roller 42, a single-layer roller or a roller with multiple-layer configuration may be used. As the single-layer roller, for example, a thing in which an elastic layer is formed on the core metal by a rubber material such as silicone rubber, urethane rubber or hydrin rubber may be used. As the roller with a multiple-layer configuration, for example, a thing in which a surface layer is formed by coating silicone resin, urethane resin, polyamide resin, fluorine resin, etc. on a surface of the same elastic layer as above may be used.

Figure 3:
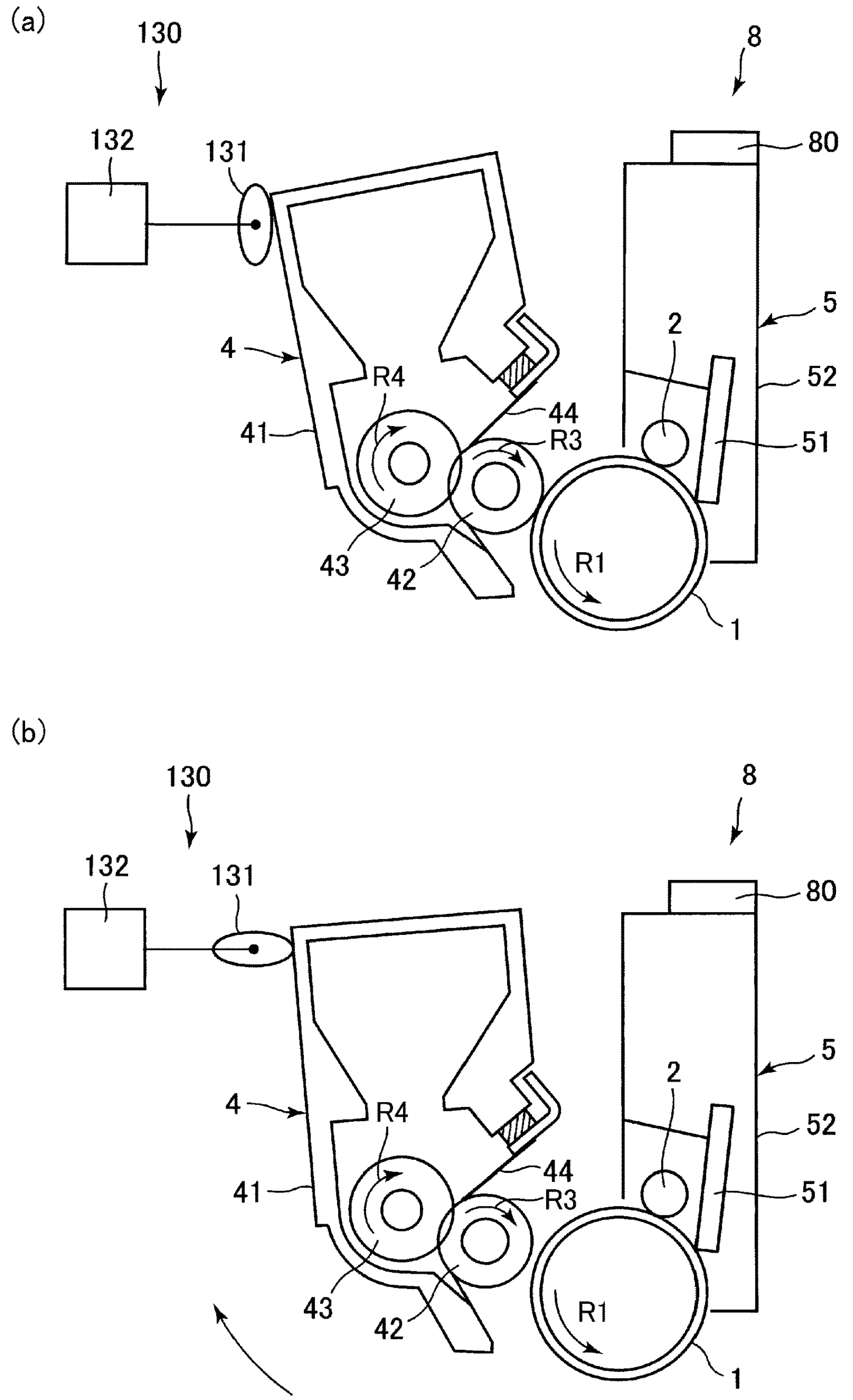
FIG. 3, part (a) and part (b), is a schematic view to describe a contact/separation mechanism (unit).

In addition, as shown in part (a) and part (b) of FIG. 3, the image forming apparatus 100 is provided with a contact/separation mechanism 130, which is a moving mechanism (unit) for contacting and separating the developing roller 42 with respect to the photosensitive drum 1. In the Embodiment 1, the contact/separation mechanism 130 is provided to each image forming portion for each color of YMCK. Part (a) of FIG. 3 illustrates a state in which the developing roller 42 is disposed in a contact position as a first position in which the developing roller 42 is in contact with the photosensitive drum 1 ("development contact state"). In addition, part (b) of FIG. 3 illustrates a state in which the developing roller 42 is disposed in a separated position as a second position in which the developing roller 42 is separated from the photosensitive drum 1 ("development separated state"). In the Embodiment 1, the developing device (developing unit) 4 is configured to be rotatable with respect to the drum unit 50, and the developing roller 42 is urged so as to move in a direction to contact to the photosensitive drum 1 by a pressing spring (not shown), which is an urging member as an urging means. In addition, in the Embodiment 1, the contact/separation mechanism 130 is constituted by a contact/separation cam 131 as a contact/separation member and a contact/separation motor 132, which is a contact/separation driving portion as a driving means. The contact/separation mechanism 130 can separate the developing roller 42 from the photosensitive drum 1 by the contact/separation cam 131 being driven by the contact/separation motor 132 to rotate the developing device 4 against the urging force of the pressing spring mentioned above (part (b) of FIG. 3). In addition, the contact/separation mechanism 130 can contact the developing roller 42 with the photosensitive drum 1 by allowing the contact/separation cam 130 to be driven by the contact/separation motor 132 and allowing the developing device 4 to be urged to rotate by the above pressing spring (part (a) of FIG. 3).

In the Embodiment 1, for example, when an operation of the image forming apparatus 100 is stopped, the developing roller 42 is in the state separated from the photosensitive drum 1 (development separated state) by the contact/separation mechanism 130. In addition, in the Embodiment 1, the photosensitive drum 1 is driven and rotated by the driving motor 127 (FIG. 4) in response to a start of the image forming operation, etc. The developing roller 42 is then driven and rotated by the common driving motor 127 (FIG. 4) with the photosensitive drum 1 in the state separated from the photosensitive drum 1 by the contact/separation mechanism 130. At a predetermined timing, the contact/separation mechanism 130 operates, and the developing roller 42 is made to be in contact with the photosensitive drum 1 at a predetermined contact width by the pressing spring to perform the developing operation, etc. In addition, in the Embodiment 1, in order to obtain an appropriate image density, the developing roller 42 is driven and rotated at a rotation speed where a moving speed (peripheral speed) of the surface of the developing roller 42 is to be 125% with respect to the moving speed (peripheral speed) of the surface of the photosensitive drum 1, for example.

The supplying roller 43 is an elastic sponge roller provided with a foam layer formed of conductive foam member on an outer periphery of a core metal. The supplying roller 43 is disposed so as to be in contact with the developing roller 42 with a predetermined penetration amount. In the Embodiment 1, the supplying roller 43 includes a foam layer formed of urethane rubber, and the urethane rubber of the foam layer contains an ion conductive agent. In the Embodiment 1, the supplying roller 43 is configured so that the ion conductive agent, which is composed of salts of cations and anions having reactive functional groups which react with isocyanate groups, is chemically bonded to the urethane rubber of the above foam layer via the above reactive functional groups. For example, the supplying roller 43 with such a configuration may be produced by foam curing of a urethane composition containing the ion conductive agent.

The regulating blade 44 is constituted by a plate-shaped elastic member having electric conductivity and flexibility. The regulating blade 44 is an approximately rectangular plate-shaped member in plain view having a predetermined length in a longitudinal direction disposed approximately parallel to a rotational axis direction of the developing roller 42 and a predetermined length in a widthwise direction perpendicular to the longitudinal direction, respectively. The regulating blade 44 is fixed to the developer container 41 at one end thereof in the widthwise direction and is supported cantileveredly, and the other end in the widthwise direction is configured to be a free end. The regulating blade 44 contacts the surface (outer peripheral surface) of the developing roller 42 at a surface near the free end. In addition, the regulating blade 44 is disposed so as to be in contact with the surface of the developing roller 42 at a position more downstream in the movement direction of the surface (rotational direction) of the developing roller 42 than the opposing portion (contact portion) between the supplying roller 43 and the developing roller 42. In the Embodiment 1, SUS material is used as the elastic member of the regulating blade 44. In addition, in the Embodiment 1, the regulating blade 44 is disposed so that the free end in the widthwise direction thereof is in a state facing an upstream side of the movement direction of the surface of the developing roller 42 (counter direction).

In addition, during the image formation (development operation), predetermined direct current voltage is applied to the developing roller 42, the supplying roller 43 and the regulating blade 44. In the Embodiment 1, during the image formation (development operation), the direct current voltage of −350 V is applied to the developing roller 42 as developing voltage (developing bias) by a developing power source 122 (FIG. 4) as a developing voltage applying means (developing voltage applying portion). In addition, during the image formation (development operation), the direct current voltage of −450 V is applied to the supplying roller 43 as supplying voltage (supplying bias) by a supplying power source 123 (FIG. 4) as a supplying voltage applying means (supplying voltage applying portion). In addition, during the image formation (development operation), the direct current voltage of −450 V is applied to the regulating blade 44 as regulating voltage (regulating bias) by a regulating power source 124 (FIG. 4) as a regulating voltage applying means (regulating voltage applying portion). In the Embodiment 1, since the normal charging polarity of the toner 90 is negative, potential difference between the supplying roller 43 and the developing roller 42 is set to polarity which urges (moves) the toner 90 from the supplying roller 43 side to the developing roller 42 side. In other words, the potential difference is formed between the supplying roller 43 and the developing roller 42, in which potential of the supplying roller 43 is larger than that of the developing roller 42 on the same polarity side as the normal charging polarity of the toner 90. By this, it becomes possible for supply of the toner 90 from the supplying roller 43 to the developing roller 42 to be stabilized. In addition, potential difference between the regulating blade 44 and the developing roller 42 is set to polarity which urges the toner 90 from the regulating blade 44 side to the developing roller 42 side. In other words, the potential difference is formed between the regulating blade 44 and the developing roller 42, in which potential of the regulating blade 44 is larger than that of the developing roller 42 on the same polarity side as the normal charging polarity of the toner 90. By this, it becomes possible for intaking of the toner 90 in the contact portion between the regulating blade 44 and the developing roller 42 to be stabilized, and for imparting of electric charge to the toner 90 by the regulating blade 44 to be stabilized.

In the Embodiment 1, non-magnetic toner with negative charge, which is manufactured with a suspension polymerization method, is used as the toner 90. It is not limited to this configuration, however, and the toner 90 may be, for example, toner manufactured by using other polymerization methods such as a pulverization method or an emulsion polymerization method. In addition, it is preferable for a volume-average particle diameter of the toner 90 to be 5.0-8.0 μm. Here, the volume-average particle diameter of the toner 90 is measured with a precision particle size distribution measuring device Multisizer 3 manufactured by Beckman Coulter Inc. In the Embodiment 1, the volume-average particle diameter of the toner 90 is about 7.0 μm.

In addition, in the Embodiment 1, all four colors of the toners 90Y, 90M, 90C and 90K are toner particles containing a toner base particle, which contains a release agent, and an organic silicon polymer on a surface of the toner base particle. The organic silicon polymer includes a T3 unit structure represented by $R—Si(O_{1/2})_3$, where R represents an alkyl group or a phenyl group with a carbon number equal to or higher than 1 and equal to or lower than 6, and the organic silicon polymer forms a protruding portion on the surface of the toner base particle. By this, a spacer effect between the surface of the toner base particle and members such as the developing roller 42 is generated and adhesion becomes smaller.

In addition, the protruding portion is characterized to be in surface-to-surface contact with the surface of the toner base particle, and by the surface-to-surface contact, a suppressing effect on moving, detaching and burying of the protruding portion may be expected remarkably. Therefore, even in a configuration in which the developing roller 42 is driven in the state separated from the photosensitive drum 1, the developing roller 42 may be used for a long period of time. In the Embodiment 1, the toner particle containing the organic silicon polymer on the surface of the toner base particle is used, however, it is not limited to this configuration but, for example, the toner particle which does not contain the organic silicon polymer on the surface of the toner base particle may be used.

In addition, a fluidizing agent, a cleaning aid, etc., which are additives (here, also referred to as "external additives"), may be added to the toner 90 to improve flowability, chargeability, cleanability, etc. Examples of external additives include inorganic oxide fine particles such as silica fine particles, alumina fine particles and titanium oxide fine particles, inorganic stearate compound fine particles such as aluminum stearate fine particles and zinc stearate fine particles and inorganic titanate compound fine particles such as strontium titanate and zinc titanate. These external additives may be used singly or in combination with two or more types. It is preferable that a gloss process be performed to these inorganic particles by silane coupling agents, titanium coupling agents, higher fatty acids, silicone oils, etc. to improve heat storage resistance and environmental stability. In addition, a BET specific surface area of the external additive is preferable to be equal to or higher than $m^2/g$ and equal to or lower than 450 $m^2/g$. The BET specific surface area may be measured by a low temperature gas adsorption method using a dynamic constant pressure method according to a BET method (preferably a BET multi-point method). For example, the BET specific surface area ($m^2/g$) may be calculated by using a specific surface area measuring device (trade name: Gemini 2375 Ver. 5.0, manufactured by Shimadzu Corporation) to make sample surfaces adsorb nitrogen gas and measure the BET specific surface area using the BET multi-point method. For an amount of these various kinds of the external additives, a total thereof should be equal to or higher than 0.05 parts by mass and equal to or lower than 5 parts by mass, preferably equal to or higher than 0.1 parts by mass and equal to or lower than 3 parts by mass, with respect to 100 parts by mass of the toner. In addition, as the external additives, various kinds of the external additives may be used in combination.

Here, in the Embodiment 1, the image forming apparatus 100 is capable of performing print operations of transferring the toner image to the recording material Pin a "full color mode" as a first image forming mode and in a "mono mode" as a second image forming mode. The "full color mode" is an image forming mode in which the image forming operations are performed with all of the image forming portions for each color of YMCK. On the other hand, the "mono mode" is an image forming mode in which the image forming operations are performed only in the image forming portion for the K color among the image forming portions for each color of YMCK. And in the Embodiment 1, upon performing the image formation in the mono mode, the developing rollers 42 in the image forming portions for each color of YMC are driven and rotated in the development separated state. In other words, in the Embodiment 1, as described above, the developing rollers 42 are driven and rotated by the common drive motor 127 (FIG. 4) with the photosensitive drums 1, and the developing rollers 42 rotate in parallel when the photosensitive drums 1 rotate. In addition, in the Embodiment 1, even in the mono mode, the photosensitive drums 1 for each color of YMC are driven and rotated to avoid rubbing against the intermediary transfer belt 7, etc. In addition, for simplification of a device configuration, etc., no clutch is being provided to a drive transmission path to the developing roller 42. Therefore, in the mono mode, when rotating photosensitive drum 1 and the developing roller 42 in contact with each other for the image forming in the image forming portion for K color, the developing rollers 42 are configured to rotate even if the photosensitive drums 1 and the developing rollers 42 are separated in the image forming portions for each color of YMC.

<Control Mode>

Figure 5:
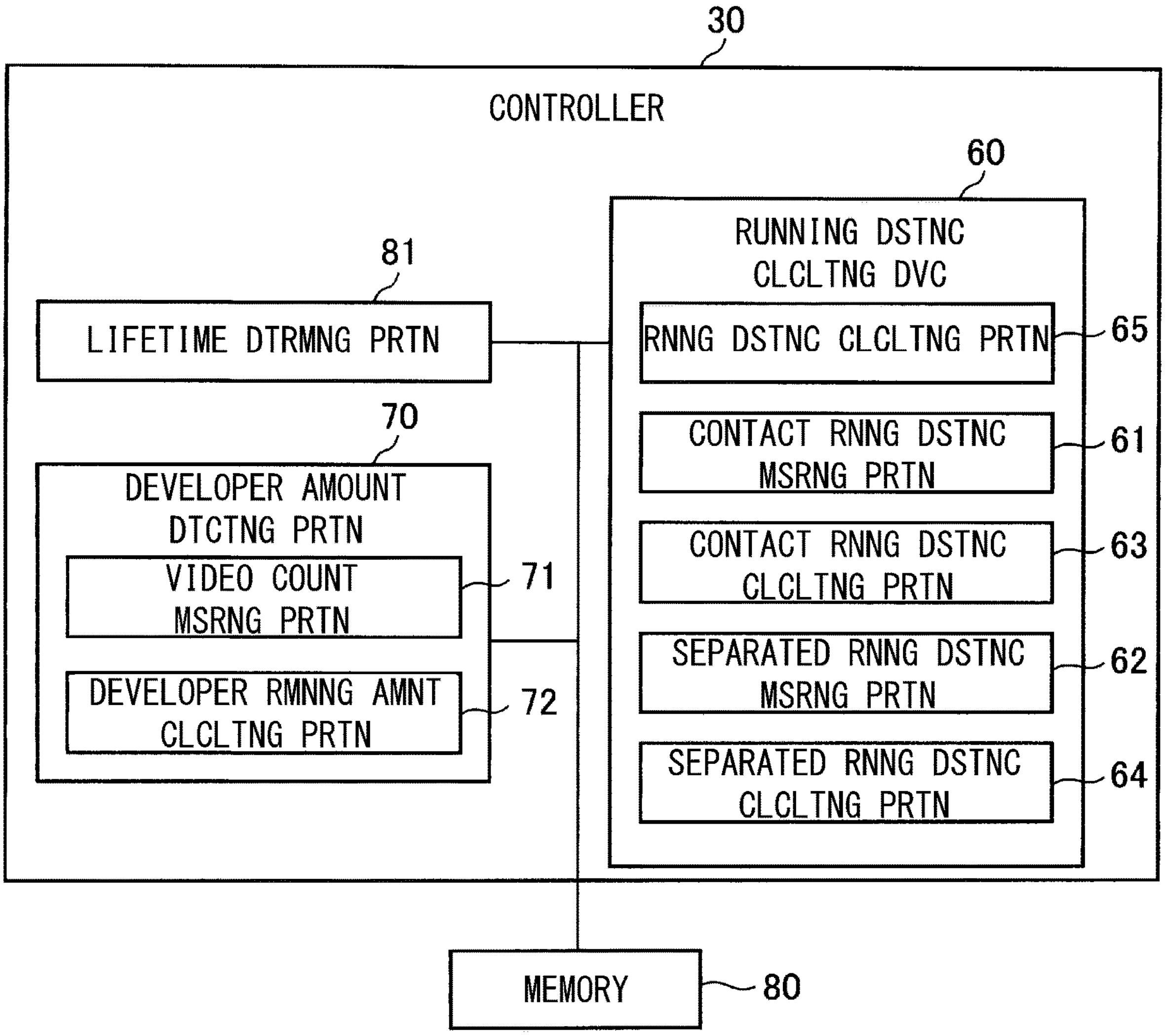
FIG. 5 is a block diagram illustrating function blocks of a control portion.

Next, a control mode of the image forming apparatus 100 in the Embodiment 1 will be described. FIG. 4 is a block diagram illustrating an outline of the control mode of the image forming apparatus 100 in the Embodiment 1. FIG. 5 is a block diagram illustrating function blocks of a control portion 30 in the Embodiment 1.

As shown in FIG. 4, the apparatus main body 110 is provided with the control portion 30 as a control means. The control portion 30 is constituted by a CPU 31 as a calculation processing means, which is a central element for performing calculation processes, a storage portion 32 such as a ROM, a RAM, and a nonvolatile memory as storage portions and an input/output portion (not shown), etc. In the ROM, control programs, data tables obtained in advance, etc. are stored. In the RAM, information input to the control portion 30, detected information, calculation results, etc. are stored. The input/output portion performs inputting and outputting of signals between the control portion 30 and devices connected thereto.

Each portion of the image forming apparatus 100 is connected to the control portion 30. The control portion 30 communicates bi-directionally with each portion of the image forming apparatus 100 to control an operation of each portion. For example, various kinds of power sources (power source devices and high-voltage power source circuits) such as a charging power source 121, a developing power source 122, the supplying power source 123, the regulating power source 124, the primary transfer power source 125 and the secondary transfer power source 126 are connected to the control portion 30. In addition, for example, various kinds of motors (driving portions, driving sources) such as the driving motor 127, the belt driving motor 129 and the contact/separation motor 132 are connected to the control portion 30. Incidentally, the driving motor 127 may be common to the image forming portions for each color of YMCK, or may be independently provided to at least one (or all) of the image forming portions for each color of YMCK. In addition, for example, an image processing portion 17, the exposure device 3, an operating panel 20, etc. are connected to the control portion 30. The control portion 30 controls each portion of the image forming apparatus 100 to execute image forming operations based on signals (start signals, image signals) input from the external devices (not shown) such as personal computers. The image processing portion (video controller) 17 generates image signals used for the image formation in the image forming apparatus 100 based on the signals input from the external devices. In addition, the operating panel 20 is configured to include a display portion for displaying information to the user (operator) according to controls of the control portion 30, an input portion for inputting information to the control portion 30 in response to user's operations, etc.

In addition, in the Embodiment 1, a memory 80 (FIG. 2 and FIG. 4), which is a nonvolatile storage means, is provided to the process cartridge 8. In the memory 80, usage information and lifetime information of the developing device 4 (developing roller 42), usage information and lifetime information of the toner 90, etc. are stored. By this, it becomes possible to calculate usage conditions and replacement timing (end of lifetime) of the developing device 4 (developing roller 42) even in a case in which the apparatus main body 110 is turned on or off, or a case in which the process cartridge 8 is replaced. In the Embodiment 1, the memory 80 is provided to the cleaning container 52. It is not limited to this configuration, however, the memory 80 may be provided to the developing device 4, for example. The control portion 30 can read and write information from and to the memory 80 of the process cartridge 8 mounted to the apparatus main body 110.

As shown in FIG. 5, the image forming apparatus 100 is provided with a running distance calculating device (acquiring portion) 60 as a rotation amount acquiring portion, a developer amount detecting device 70 as a developer amount acquiring portion, and a lifetime determining portion 81 as a notifying portion. In the Embodiment 1, the running distance calculating device 60, the developer amount detecting device 70 and the lifetime determining portion 81 are operated by the CPU 31 by executing programs stored in the storage portion (ROM) 32.

The running distance calculating device 60 is provided with a contact running distance measuring portion 61 which counts (measures) a contact running distance W1, which is a running distance as a rotation amount of the developing roller 42 in the development contact state. In addition, the running distance calculating device 60 is provided with a separated running distance measuring portion 62 which counts (measures) a separated running distance W2, which is a running distance as the rotation amount of the developing roller 42 in the development separated state. In addition, the running distance calculating device 60 is provided with a contact running distance calculating portion 63 which corrects the contact running distance W1. In addition, the running distance calculating device 60 is provided with a separated running distance calculating portion 64 which corrects the separated running distance W2. In addition, the running distance calculating device 60 is provided with a running distance calculating portion 65 which calculates a running distance as the rotation amount of the developing roller 42 from the corrected contact running distance and the corrected separated running distance.

However, information regarding the rotation amount of the developing roller 42 is not limited to the running distance of the developing roller 42, but may also be a number of rotations, rotation time (driving time), etc. of the developing roller 42, or any other index value which correlates with the rotation amount (driving amount) of the developing roller 42.

The developer amount detecting device 70 detects a remaining amount of the toner 90 in the developing device 4 (toner remaining amount) as developer amount information regarding the amount of the toner 90 in the developing device 4 (toner amount). In the Embodiment 1, a video count method is used as a detecting method of the toner amount. The developer amount detecting device 70 is provided with a video count measuring portion 71 which measures pixel information (number of pixel signal: video count value) of an output image (image portion of the electrostatic latent image) formed on the recording material P by the image forming operation. In addition, the developer amount detecting device 70 is provided with a developer remaining amount calculating portion 72 which calculates the toner remaining amount in the developing device 4 based on the measured video count value.

However, the detecting method of the toner amount is not limited to the developer amount detecting device 70 of the video count method. For example, known detecting methods for the toner remaining amount such as an electrostatic capacity method, a light transmission method (optical detecting method), weight detecting method, developer surface detecting method, etc. may be used. The electrostatic capacity method is a method using electrodes whose detected electrostatic capacity changes in accordance with changes in a state of the toner in the developing device 4 (for example, attaching conductive members to an inner wall of the container), and detecting the toner amount in the developing device 4 based on changes in the detected electrostatic capacity. The light transmission method is a method using a light source which irradiates an inside of the developing device 4 with light and a light receiving portion which receives the light passing through the inside of the developing device 4, and detecting the toner amount based on changes in a light receiving state of the light receiving portion. In addition, the weight detecting method is a method detecting the toner amount in the developing device 4 based on a weight of the developing device 4 accommodating the toner. In addition, the developer surface detecting method is a method detecting the toner amount in the developing device 4 based on a position (height) of a surface of the toner in the developing device 4. Each of the detecting methods of the toner amount, such as the video count method, the electrostatic capacity method, the light transmission method, the weight detecting method, the toner surface detecting method, etc. may be used singly or in combinations. Specifically, for example, when the toner remaining amount obtained by the video count method is equal to or lower than a predetermined toner remaining amount, it may be configured so that other methods such as the electrostatic capacity method, the light transmission method, etc. is used.

The lifetime determining portion 81 performs lifetime determination of the developing device 4 (determining that the developing device 4 has reached the end of the lifetime thereof) based on the running distance of the developing roller 42 calculated by the running distance calculating device 60. The lifetime determining portion 81 then notifies the user by displaying a notification on the operating panel 20 that the developing device 4 has reached the end of the lifetime thereof. In addition, in the Embodiment 1, the lifetime determining portion 81 also notifies the user, in a case in which the toner remaining amount reaches a predetermined toner remaining amount (in the Embodiment 1, in a case in which the toner is substantially run out) based on the toner remaining amount detected by the developer amount detecting device 70, by displaying the fact on the operating panel 20. By this, it becomes possible to notify the end of the lifetime (replacement timing) of the developing device 4 more appropriately.

<Calculation of the Running Distance of the Developing Roller>

Next, a calculation of the running distance of the developing roller 42 in the Embodiment 1 will be described.

In the Embodiment 1, the contact running distance W1 and the separated running distance W2 are measured, and a first load correction coefficient k1 and a second load correction coefficient k2 are used to correct the contact running distance W1 and the separated running distance W2, respectively. The running distance of the developing roller 42 is then calculated based on the corrected values.

The contact running distance measuring portion 61, as a contact running distance acquiring portion (first information acquiring portion), measures the contact running distance (first information) W1 based on driving time Td1 of the developing device 4 in the development contact state, a process speed Ps of the image forming apparatus 100 and ratio (here, also referred to as a "development peripheral speed ratio") Sr of the moving speeds (peripheral speeds) of the developing roller 42 and the photosensitive drum 1. Here, the contact running distance W1 is a distance (surface movement distance) representing how far a certain point on the surface of the developing roller 42 advances (moves) by the rotation of the developing roller 42 in the development contact state. In addition, the process speed Ps of the image forming apparatus 100 is the rotation speed (peripheral speed) of the photosensitive drum 1. In addition, the development peripheral speed ratio Sr is a ratio of the peripheral speed of the developing roller 42 with respect to the peripheral speed of the photosensitive drum 1 (=the peripheral speed of the developing roller 42/the peripheral speed of the photosensitive drum 1).

Specifically, the contact running distance W1 is calculated by the following formula (1).

$$W1 = Td1 \times Ps \times Sr \tag{1}$$

Similarly, the separated running distance measuring portion 62, as a separated running distance acquiring portion (second information acquiring portion), measures the separated running distance (second information) W2 based on driving time Td2 of the developing device 4 in the development separated state, the process speed Ps of the image forming apparatus 100, and the development peripheral speed ratio Sr. Here, the separated running distance W2 is a distance (surface movement distance) representing how far a certain point on the surface of the developing roller 42 advances (moves) by the rotation of the developing roller 42 in the development separated state. Specifically, the separated running distance W2 is calculated by the following formula (2).

$$W2 = Td2 \times Ps \times Sr \quad (2)$$

Next, the contact running distance calculating portion 63 reads out the first load correction coefficient k1 stored in the memory 80 when the contact running distance W1 is measured by the contact running distance measuring portion 61. Then, the contact running distance calculating portion 63, as a first corrected distance acquiring portion (third information acquiring portion), multiplies the contact running distance W1 by the first load correction coefficient k1 to calculate a corrected contact running distance (third information) H1. Specifically, the corrected contact running distance H1 is calculated by the following formula (3).

$$H1 = k1 \times W1 \quad (3)$$

Similarly, the separated running distance calculating portion 64 reads out the second load correction coefficient k2 stored in the memory 80 when the separated running distance W2 is measured by the separated running distance measuring portion 62. Then, the separated running distance calculating portion 64, as a second corrected distance acquiring portion (fourth information acquiring portion), multiplies the separated running distance W2 by the second load correction coefficient k2 to calculate a corrected separated running distance (fourth information) H2. Specifically, the corrected separated running distance H2 is calculated by the following formula (4).

$$H2 = k2 \times W2 \quad (4)$$

Next, the running distance calculating portion 65 adds the corrected contact running distance H1 and the corrected separated running distance H2 to obtain an added running distance (added rotation amount) H. Specifically, the added running distance H is calculated by the following formula (5).

$$H = H1 + H2 \quad (5)$$

Further, the running distance calculating portion 65, as a total corrected distance acquiring portion (fifth information acquiring portion), each time the calculated added running distance H increases by a predetermined distance Hu, adds (integrates) the above predetermined added running distance Hu to an accumulated added running distance Hr, which is stored in the memory 80 and is accumulated from a beginning of use of the developing device 4 (process cartridge 8) (from when it is new), to calculate a total accumulated added running distance (fifth information) Ht, which is a total corrected distance (total rotation amount). Specifically, the total accumulated added running distance Ht is calculated by the following formula (6).

$$Ht = Hr + Hu \quad (6)$$

In the Embodiment 1, the above predetermined added running distance Hu is set to be approximately 2 sheets of A4 size sheet (approximately 300 mm). However, the predetermined added running distance Hu is not limited to this configuration, but may be set as needed according to configurations of the device, desired accuracy of the lifetime determination, etc. For example, instead of the predetermined added running distance Hu, the added running distance H itself may be integrated.

Next, the lifetime determining portion 81 calculates a developing roller remaining lifetime GJ based on a running distance threshold value Wth stored in the memory 80 and the total accumulated added running distance Ht. Specifically, the developing roller remaining lifetime GJ is calculated by the following formula (7).

$$GJ\,[\%] = (1 - Ht/Wth) \times 100 \quad (7)$$

The lifetime determining portion 81 then writes (updates) the obtained total accumulated added running distance Ht to the memory 80 as a new accumulated added running distance Hr.

Here, when the developing roller remaining lifetime GJ=100%, it indicates that the developing device 4 (process cartridge 8) is new. In addition, when the developing roller remaining lifetime GJ≤0%, that is, when the total accumulated added running distance Ht exceeds the running distance threshold value Wth, it indicates that the developing device 4 (process cartridge 8) has reached the end of the lifetime thereof and it is the replacement timing of the developing device 4 (process cartridge 8).

When the developing roller remaining lifetime GJ≤0%, the lifetime determining portion 81 notifies the user by displaying the notification on the operating panel 20 that the developing device 4 has reached the end of the lifetime thereof. Contents of the display may simply be what notifies the user that the developing device 4 (developing roller 42) has reached the end of the lifetime thereof, what instructs the user replace the developing device 4 (process cartridge 8), or may be both.

As described above, in the Embodiment 1, the first correction coefficient k1 and the second load correction coefficient k2 are used to correct the contact running distance W1 and the separated running distance W2, respectively. By this, it becomes possible to perform a counting of the running distance of the developing roller 42 in the development contact state and the development separated state, respectively, with taking into account effect of rubbing received by the toner 90 and effect of filming received by the developing roller 42. Here, the "filming" is a phenomenon in which the toner and the external additives added to the toner adhere to and accumulate on the surface of the developing roller 42. As the filming of the developing roller 42 progresses, an increase of an electric resistance value of the developing roller 42 and a decrease of a surface roughness of the developing roller 42 may occur. As a result, it becomes impossible to impart appropriate electric charge to the toner and to secure the toner amount necessary to obtain a desired image density, and defects such as a toner adhesion to non-image portion (so-called fogging) and a decrease of image density may occur.

Specifically, in the development separated state, the effect of the rubbing to the toner 90 is less and the progress of the filming of the developing roller 42 is slower than in the development contact state. In consideration of this, the load correction coefficients are set so that an advancement of the running distance of the developing roller 42 in the development separated state is slower than the advancement of the running distance in the development contact state (k1>k2). In the Embodiment 1, the first load correction coefficient (first correction coefficient) k1 is set to 1.0 and the second load correction coefficient (second correction coefficient) k2 is set to 0.08. In other words, an absolute value of the first correction coefficient is greater than an absolute value of the second correction coefficient. In the Embodiment 1, the information of the first load correction coefficient k1 and the second load correction coefficient k2 is stored in the memory 80 being provided to the process cartridge 8.

By the way, the large difference between k1 and k2 is related to the characteristics of the toner 90 used in the Embodiment 1. In particular, in the Embodiment 1, the toner particles which contain the organic silicon polymer on the surface of the toner base particles are used, and the protruding portions formed on the surface of the toner base particles have high durability against loads by being rubbed repeatedly. Therefore, when the loads of rubbing against the toner 90 is small, the progress of filming of the developing roller 42 is considered to become smaller. Therefore, there is the large difference between k1 and k2. For the toner of the present Embodiment, k2 is set to lower than 30% of k1. Furthermore, lower than 10% is preferred. In addition, in the Embodiment 1, since degree of the effect of the toner 90 of each color on the filming of the developing roller 42 is substantially the same, the set values of the first load correction coefficient k1 and the second load correction coefficient k2 are common to the developing devices 4Y, 4M, 4C and 4K for each color of YMCK, respectively. However, it is not limited to this configuration. The degree of progression of the filming of the developing roller 42 varies depending, for example, on physical properties and shapes of the toner 90, types, shapes or amount of the additives, physical properties and a surface shape of the developing roller 42, physical properties, a surface shape or contact conditions of the members in contact with the developing roller 42, etc. Therefore, at least one of the first load correction coefficient k1 and the second load correction coefficient k2 may be set to be different in at least one of the developing devices 4Y, 4M, 4C and 4K for each color of YMCK from those for other colors in accordance with those conditions. For example, at least one of the first load correction coefficient k1 and the second load correction coefficient k2 may be set individually on the each developing device 4Y, 4M, 4C and 4K for each color of YMCK.

<Detection of the Toner Remaining Amount>

Next, the developer amount detecting device 70 of the video count method in the Embodiment 1 will be described.

The video count measuring portion 71 of the developer amount detecting device 70 measures the pixel information (video count value) of the output image. In the Embodiment 1, the pixel information (video count value) for one sheet of the recording material P to be output is defined as a video count value VCn (usage amount of the toner 90).

The developer remaining amount calculating portion 72 of the developer amount detecting device 70 adds the video count value Von measured by the video count measuring portion 71 to an accumulated video count value VCr, which is stored in the memory 80, accumulated from a beginning of use of the developing device 4 (process cartridge 8) to calculate a total video count value VCt. Specifically, the total video count value VCt is calculated by the following formula (8).

$$VCt = VCr + VCn \tag{8}$$

Next, the developer remaining amount calculating portion 72 calculates a toner remaining amount TJ in the developing device 4 based on a video count threshold value VCth, which is stored in the memory 80, and the total video count value VCt. Specifically, the toner remaining amount TJ in the developing device 4 is calculated by the following formula (9).

$$TJ\,[\%] = (1 - VCt/VCth) \times 100 \tag{9}$$

Then, the developer remaining amount calculating portion 72 writes (updates) the obtained total video count value VCt to the memory 80 as a new accumulated video count value VCr.

Here, when the toner remaining amount TJ=100%, it indicates that the toner 90 in the developing device 4 is full and the developing device 4 (process cartridge 8) is new. In addition, when the toner remaining amount TJ≤0%, i.e., when the total video count value VCt exceeds the video count threshold value VCth, it indicates that the toner 90 in the developing device 4, which is usable for the image formation, is substantially run out and it is the replacement timing of the developing device 4 (process cartridge 8).

When the toner remaining amount TJ≤0%, the lifetime determining portion 81 notifies the user by displaying a notification on the operating panel 20 that the toner in the developing device 4 is run out. Contents of the display may simply be what notifies the user that the toner in the developing device 4 is run out, what instructs the user replace the developing device 4 (process cartridge 8), or may be both.

Incidentally, the toner remaining amount may be evaluated by an index of a toner consumed amount. In such a case, the toner consumed amount is 0% when it is new and the toner consumed amount will be added up, and the toner consumed amount 100% is defined as when the toner amount in the developing device 4 is decreased to a predetermined threshold value.

<Lifetime Determination Sequence of the Developing Device>

Figure 6:
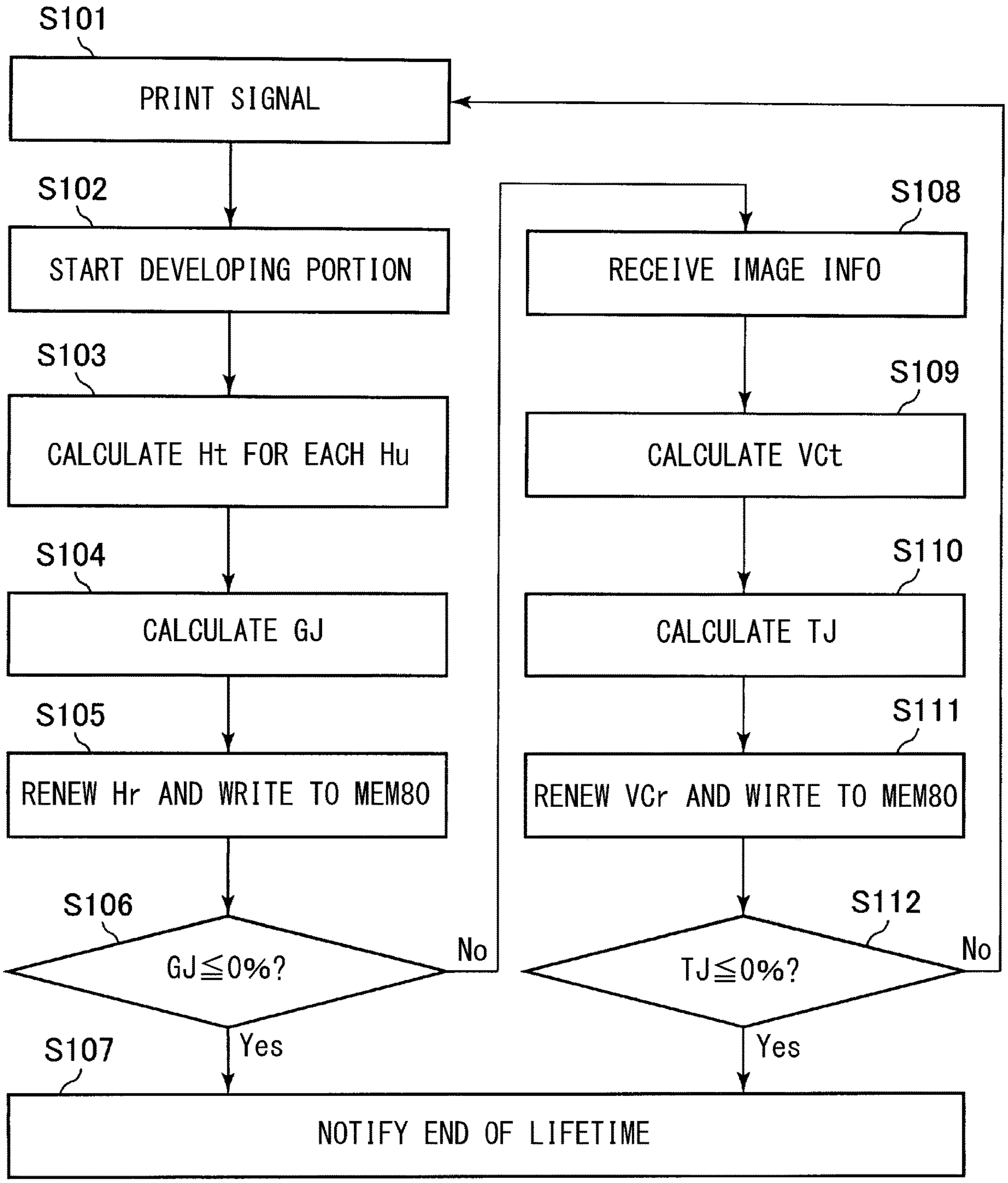
FIG. 6 is a flowchart diagram of a lifetime determination sequence in an Embodiment 1.

Next, the lifetime determination sequence of the developing device 4 in the Embodiment 1 will be described. FIG. 6 is a flowchart diagram of the lifetime determination sequence of the developing device 4 in the Embodiment 1. The control portion 30 can perform the lifetime determination of the developing device 4 by performing each of processes shown in FIG. 6 based on information in the memory 80 being provided to the process cartridge 8, and notify the result to the user. The lifetime determination of the developing device 4 (lifetime notification) by the lifetime determination sequence shown in FIG. 6 is performed in the image forming portions for each color of YMCK, respectively.

First, when a print signal (start signal, image signal) is sent to the image forming apparatus 100 (S101), the control portion 30 drives the developing portion 4 to start the image forming operation (S102).

Next, for each predetermined added running distance Hu, the control portion 30 calculates the total accumulated added running distance Ht by adding (integrating) the distance Hu to the accumulated added running distance Hr stored in the memory 80 in the running distance calculating portion 65 (S103). The control portion 30 then calculates the developing roller remaining lifetime GJ (S104) and writes the total accumulated added running distance Ht to the memory 80 as a new accumulated added running distance Hr (S105).

Next, the control portion 30 determines whether or not the developing roller remaining lifetime GJ is equal to or lower than 0% (predetermined remaining lifetime threshold value) (S106). If the control portion 30 determines that the developing roller remaining lifetime GJ is equal to or lower than 0%, then the control portion 30 notifies the user by displaying the notification on the operating panel 20 being provided to the apparatus main body 110 that the developing device 4 has reached the end of the lifetime thereof (S107). On the other hand, if the control portion 30 determines that the developing roller remaining lifetime GJ is not equal to or lower than 0% (greater than 0%), then the control portion 30 proceeds to S108.

Next, the control portion 30 receives the image information at the developer amount detecting device 70 (S108). The control portion 30 then measures the video count value VCn in the video count measuring portion 71 and calculates the total video count value VCt in the developer remaining amount calculating portion 72 (S109). The control portion 30 then calculates the toner remaining amount TJ (S110) and writes the total video count value VCt to the memory 80 as a new accumulated video count value VCr (S111).

Next, the control portion 30 determines whether or not the toner remaining amount TJ is equal to or lower than 0% (predetermined toner remaining amount threshold value) (S112). If the control portion 30 determines that the toner remaining amount TJ is equal to or lower than 0%, then the control portion 30 notifies the user by displaying the notification on the operating panel 20 being provided to the apparatus main body 110 that the toner 90 in the developing device 4 is substantially run out and it is the replacement timing of the developing device 4 (S107). On the other hand, if the control portion 30 determines that the toner remaining amount TJ is not equal to or lower than 0% (greater than 0%), then the control portion 30 prepares for the next image formation. Here, as described above, the notifications that the developing device 4 (developing roller 42) has reached the end of the lifetime thereof and it is the replacement timing of the developing device 4, and that the toner 90 in the developing device 4 is substantially run out and it is the replacement timing of the developing device 4, are also simply called “lifetime notification”.

Here, in the Embodiment 1, the processes S108-S112 are executed after the processes S102-S106, however, the flow may be reversed (the processes S102-S106 are executed after the processes S108-S112). In addition, the flow may be configured as the processes S102-S106 and the processes S108-S112 are executed in parallel.

Incidentally, timing for obtaining the toner remaining amount may be, for example, every predetermined added running distance Hu, which is the timing for detecting the running distance of the developing roller 42, i.e., at a time interval when the developing roller 42 runs the predetermined added running distance Hu. Alternatively, the timing for obtaining the toner remaining amount may be, for example, multiple times within time when the developing roller 42 runs the predetermined added running distance Hu.

As described above, in the Embodiment 1, the running distance of the developing roller 42 is acquired, which is taking into account, for example, the effect of the rubbing received by the toner 90 and the effect of the filming received by the developing roller 42 in each of the development contact state and the development separated state. And based on the running distance of the developing roller 42, the lifetime determination of the developing device 4 is performed and the notification is given to the user. By this, it becomes possible to perform an appropriate lifetime determination according to the filming state of the developing rollers 42 of each developing device 4, even if the developing devices 4Y, 4M and 4C for each color of YMC are driven more often in the development separated state, for example, in the mono mode, etc.

Furthermore, in the Embodiment 1, it is also notified that the toner 90 in the developing device 4 is substantially run out based on the detected result of the developer amount detecting device 70. In other words, even in a case in which the rotation amount of the developing roller 42 does not exceed the predetermined threshold value, when the toner remaining amount in the developing device 4 is equal to or lower than the predetermined threshold value, then the developing device 4 is determined to have reached the lifetime thereof. By this, it is possible to notify not only the lifetime of the developing device 4 due to the filming of the developing roller 42, but also the lifetime of the developing device 4 due to the toner remaining amount, therefore it becomes possible to notify the user the replacement timing of the developing device 4 (process cartridge 8) more appropriately.

Incidentally, in the Embodiment 1, only the running distance threshold value Wth is used as the threshold value for the running distance of the developing roller 42, however, it is not limited to this configuration. For example, a lifetime notice threshold value WL may be set before the running distance threshold value Wth is reached. In other words, a control may be performed to notify a lifetime ending notice of the developing device 4 when the total accumulated added running distance Ht reaches or exceeds the lifetime notice threshold value WL. In a case in which the lifetime notice threshold value WL is set to be, for example, 90% of the running distance threshold value Wth, it is possible to notify the user a warning that the end of the lifetime of the developing roller 4 is approaching when the developing roller remaining lifetime GJ reaches 10%. Therefore, the user can prepare for the replacement of the developing device 4 (process cartridge 8) in advance. The same applies to the toner remaining amount.

In addition, in the Embodiment 1, it is configured that the end of the lifetime of the developing device 4 is notified when the developing roller remaining lifetime GJ reaches 0%. However, it is not limited to this configuration, but it may also be possible, for example, to display the developing roller remaining lifetime GJ on the operating panel each time the total accumulated added running distance Ht is updated. Other than notifying the developing roller remaining lifetime GJ through the control by the control portion 30 automatically in this manner, the developing roller remaining lifetime GJ may also be notified at any timing according to the user's operation on the operating panel 20. By this, it becomes possible to inform the user how much more of the developing device 4 (process cartridge 8) can be used, thus, to provide the image forming apparatus 100 with better usability. The same applies to the toner remaining amount.

In addition, the lifetime determination of the developing device 4 based on the various kinds of calculations described above may be, for example, calculated and controlled during the operation of the image forming apparatus 100 or may be controlled using tables, etc. stored in the storage portion (ROM) 32 in advance.

Next, a Comparative Example 1 will be described. The basic configurations and operations of the image forming apparatus 100 of the Comparative Example 1 are the same as those of the Embodiment 1. Therefore, the elements of the image forming apparatus of the Comparative Example 1 that are provided with functions or configurations identical or corresponding to those of the image forming apparatus 100 of the Embodiment 1 are marked with the same reference numeral as in the Embodiment 1, and detailed descriptions will be omitted. The same applies to a Comparative Example 2 described below.

Figure 7:
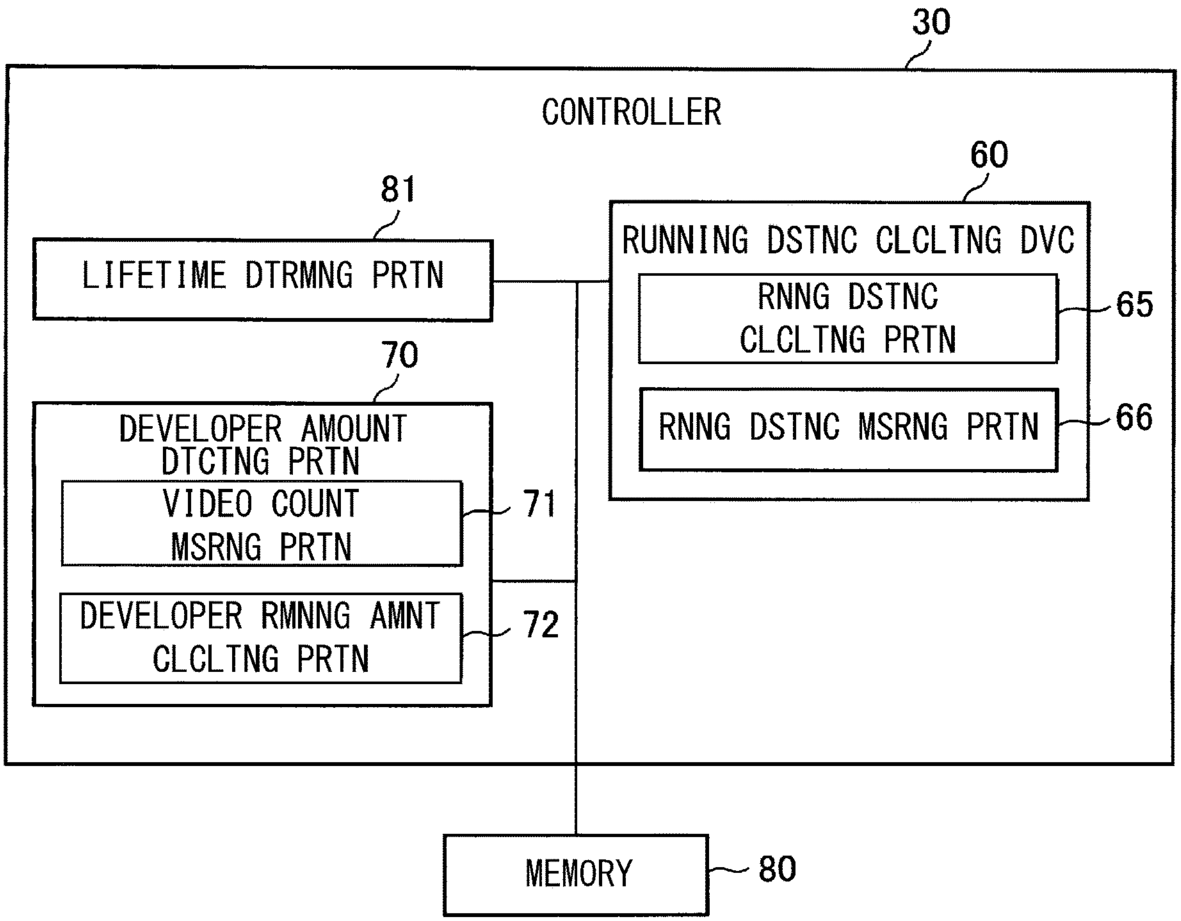
FIG. 7 is a block diagram illustrating function blocks of a control portion in a Comparative Example 1 and a Comparative Example 2.

In the Comparative Example 1, the running distance of the developing roller 42 is counted without distinguishing between the development contact state and the development separated state, and in addition, the running distance of the developing roller 42 is not corrected. FIG. 7 is a block diagram illustrating function blocks of the control portion 30 in the Comparative Example 1. In the Comparative Example 1, the running distance calculating device 60 is provided with the running distance measuring portion 66, which counts a running distance W of the developing roller 42 regardless of whether the developing roller 42 is in the development contact state or the development separated state, and the running distance calculating portion 65.

(Calculation of the Running Distance of the Developing Roller)

In the Comparative Example 1, the running distance measuring portion 66 measures the running distance W based on the driving time Td of the developing device 4, the process speed Ps of the image forming apparatus 100 and the development peripheral speed ratio Sr. Here, in the Comparative Example 1, the running distance W is a distance (surface movement distance) which represents how far a certain point on the surface of the developing roller 42 advances (moves) by the rotation of the developing roller 42, regardless of whether the developing roller 42 is in the development contact state or the development separated state. Specifically, the running distance W is calculated by the following formula (10).

$$W = Td \times Ps \times Sr \tag{10}$$

Next, the running distance calculating portion 65, each time the running distance W calculated by the running distance measuring portion 66 increases by a predetermined distance Wu, adds (integrates) the above predetermined running distance Wu to an accumulated running distance Wr stored in the memory 80 accumulated from the beginning of use of the developing device 4 (process cartridge 8) to calculate a total accumulated running distance Wt, which is a total distance. Specifically, the total accumulated running distance Wt is calculated by the following formula (11).

$$Wt = Wr + Wu \tag{11}$$

In the Comparative Example 1, the above predetermined running distance Wu is set to be approximately 2 sheets of A4 size sheet (approximately 300 mm).

Next, the lifetime determining portion 81 calculates the developing roller remaining lifetime GJ based on a running distance threshold value Wth stored in the memory 80 and a total accumulated running distance Wt. Specifically, the developing roller remaining lifetime GJ is calculated by the following formula (12).

$$GJ\,[\%] = (1 - Wt/Wth) \times 100 \tag{12}$$

The lifetime determining portion 81 then writes the total accumulated running distance Wt to the memory 80 as a new accumulated running distance Wr.

Here, when the developing roller remaining lifetime GJ=100%, it indicates that the developing device 4 (process cartridge 8) is new. In addition, when the developing roller remaining lifetime GJ≤0%, i.e., the total accumulated running distance Wt exceeds the running distance threshold value Wth, it indicates that the developing device 4 (process cartridge 8) has reached the end of the lifetime thereof and it is the replacement timing of the developing device 4 (process cartridge 8).

(Lifetime Determination Sequence of the Developing Device)

Figure 8:
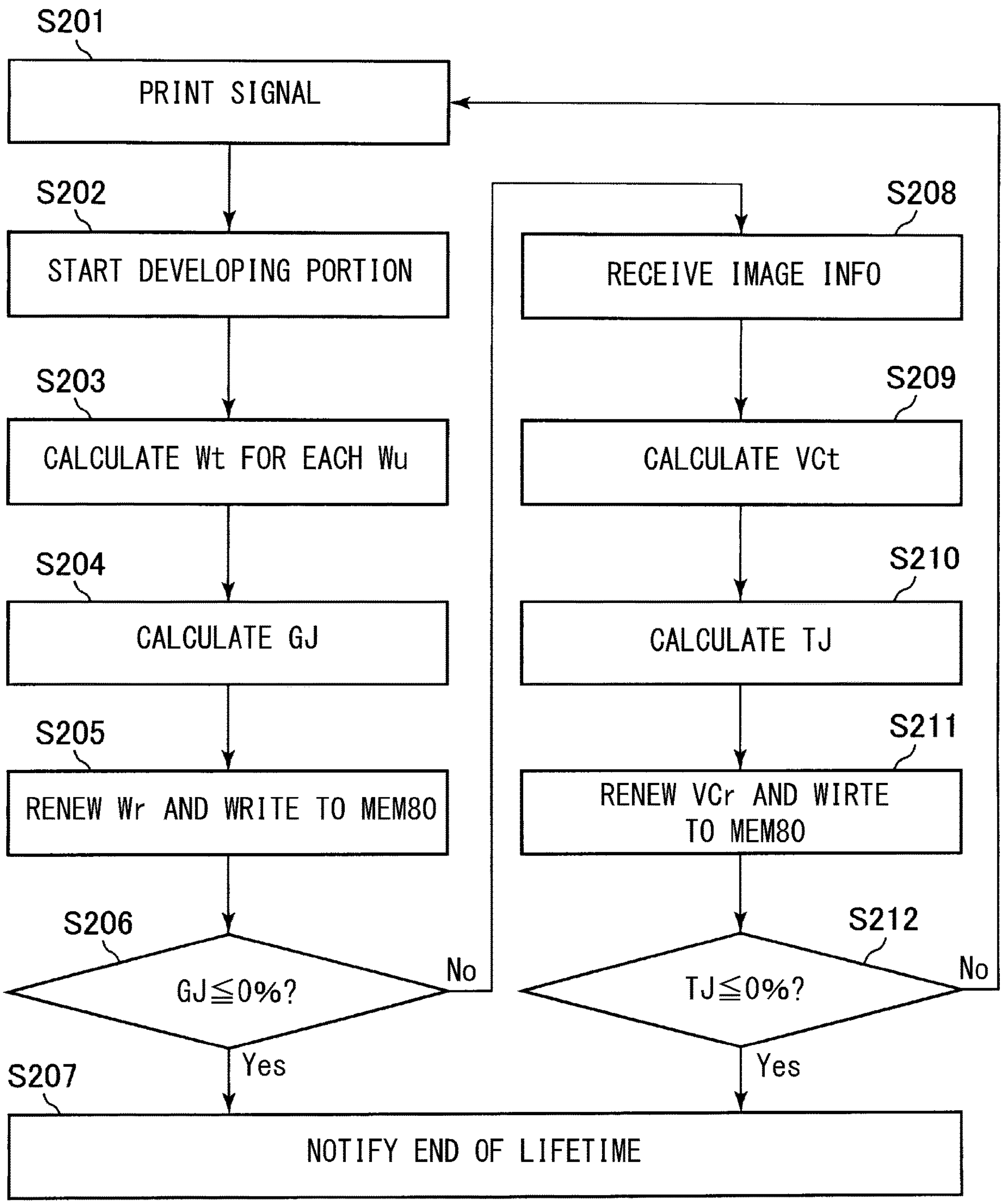
FIG. 8 is a flowchart diagram of the lifetime determination sequence in the Comparative Example 1 and the Comparative Example 2.

FIG. 8 is a flowchart diagram of the lifetime determination sequence of the developing device 4 in the Comparative Example 1.

First, when a print signal (start signal, image signal) is sent to the image forming apparatus 100 (S201), the control portion 30 drives the developing portion 4 to start the image forming operation (S202).

Next, for each predetermined running distance Wu, the control portion 30 calculates the total accumulated running distance Wt by adding (integrating) the distance Wu to the accumulated running distance Wr stored in the memory 80 in the running distance calculating portion 65 (S203). The control portion 30 then calculates the developing roller remaining lifetime GJ (S204) and writes the total accumulated running distance Wt to the memory 80 as a new accumulated running distance Wr (S205).

Next, the control portion 30 determines whether or not the developing roller remaining lifetime GJ is equal to or lower than 0% (predetermined remaining lifetime threshold value) (S206). If the control portion 30 determines that the developing roller remaining lifetime GJ is equal to or lower than 0%, then the control portion 30 notifies the user by displaying the notification on the operating panel 20 being provided to the apparatus main body 110 that the developing device 4 has reached the end of the lifetime thereof (S207). On the other hand, if the control portion 30 determines that the developing roller remaining lifetime GJ is not equal to or lower than 0% (greater than 0%), then the control portion 30 proceeds to S208.

The processes of steps from S208 to S212 are the same as those of S108 to S112 in FIG. 6 in the Embodiment 1, therefore the description will be omitted.

Next, the Comparative Example 2 will be described. In the Comparative Example 2, only the contact running distance, which is the running distance of the developing roller 42 in the development contact state, is counted, and the separated running distance, which is the running distance of the developing roller 42 in the development separated state, is not counted. In other words, in the Comparative Example 2, the contact running distance is used as the running distance W.

(Calculation of the Running Distance of the Developing Roller)

The function blocks of the control portion 30 in the Comparative Example 2 is the same as those of the Comparative Example 1 shown in FIG. 7. In the Comparative Example 2, the running distance measuring portion 66 measures a running distance W based on the driving time Td1 of the developing device 4 in the development contact state, the process speed Ps of the image forming apparatus 100, and the development peripheral speed ratio Sr. Here, in the Comparative Example 2, the running distance W is a distance (surface movement distance) which represents how far a certain point on the surface of the developing roller 42 advances (moves) by the rotation of the developing roller 42 in the development contact state. Specifically, the running distance W is calculated by the following formula (13).

$$W = Td1 \times Ps \times Sr \quad (13)$$

Since the subsequent processes are the same as in the Comparative Example 1, the description will be omitted.

<Effectiveness Verification>

(Evaluation Method)

To confirm an effectiveness of the Embodiment 1, evaluation of the lifetime of the developing device 4 (process cartridge 8) was performed from the beginning of use (when the developing roller remaining lifetime GJ is 100%) until when the developing roller remaining lifetime GJ reaches 0%.

Specifically, a horizontal line image (a line extending in a direction approximately perpendicular to a conveyance direction of the recording paper) with image ratio from 1 to 2% was printed intermittently on the recording papers of A4 size. Here, the intermittent printing means a printing method in which an operation of the developing device 4 (image forming apparatus 100) is temporarily stopped after printing a predetermined number of sheets, and then the printing operation is performed again. In this evaluation, the developing device 4 (image forming apparatus 100) was set to stop the operation once after the printing on two sheets continuously, and then to perform the printing operation again. In addition, the evaluation was conducted under the following evaluation conditions in an environment of temperature of 23° C. and relative humidity of 50%.

Running distance threshold value Wth: equivalent to 3000 sheets of 2-sheet intermittent printing on the recording papers of A4 size Evaluation mode (1): Images are formed only in full color mode Evaluation mode (2): Images are formed so that a usage ratio between the mono mode and the full color mode is 5:5 on average Then, in each evaluation mode, a condition of an occurrence of an image defect was evaluated when the developing roller remaining lifetime GJ reached 0%. In this evaluation, as the image defect, a decrease of an image density (in particular, a latter half weak concentration in a full black image) due to the filming of the developing roller 42 was judged and evaluated visually based on the following standards.

○: No occurrence of the latter half weak concentration, or there is a minor occurrence but no practical problem x: The latter half weak concentration occurs noticeably, and there is a practical problem Furthermore, in this evaluation, a number of sheets printed before the developing roller remaining lifetime GJ reaches 0% (here, also referred to as a "number of possible prints") was also compared. Specifically, with respect to the process cartridges 8Y, 8M and 8C for each color of YMC, the image formation is not performed in the mono mode, therefore a number of sheets printed in the full color mode becomes the number of possible prints. On the other hand, with respect to the process cartridge 8K for K color, a total of the numbers of prints in each image forming mode becomes the number of possible prints since the image formations are performed both in the full color mode and the mono mode. In other words, for the process cartridge 8K for K color, the number of possible prints in a case in which the images are formed both in the full color mode and the mono mode is substantially the same number as the number of possible prints in a case in which images are formed only in the full color mode. Therefore, in the present evaluation, a comparison was performed using the process cartridges 8Y, 8M and 8C for each color of YMC, where the effect of the Embodiment 1 is more pronounced.

Comparison of the Embodiment 1 to the Comparative Example 1 and the Comparative Example 2

The evaluation results are shown in Table 1.

TABLE 1

| | Evaluation mode (1) (Full color mode) | | | Evaluation mode (2) (Mono mode + Full color mode) | | |
|---|---|---|---|---|---|---|
| | Latter half weak concentration | Number of possible prints | Number of total prints | Latter half weak concentration | Number of possible prints | Number of total prints |
| Emb 1 | ○ | 3000 | 3000 | ○ | 2600 | 3000 |
| Cmp 1 | ○ | 3000 | 3000 | ○ | 1500 | 3000 |
| Cmp 2 | ○ | 3000 | 3000 | x | 3000 | 6000 |

In the evaluation mode (1), there was no significant difference among the Embodiment 1, the Comparative example 1 and the Comparative example 2, the number of possible prints were substantially the same, and there was no occurrence of the latter half weak concentration until the developing roller remaining life GJ reached 0%.

On the other hand, in the evaluation mode (2), there is a difference among the Embodiment 1, the Comparative Example 1 and the Comparative Example 2.

First, in the evaluation mode (2), in the Comparative Example 1, when the developing roller remaining lifetime GJ reached 0%, the latter half weak concentration did not occur, but the number of possible prints was as low as 1500. This is because, in the Comparative Example 1, the running distance of the developing roller 42 is counted without distinguishing between the development contact state and the development separated state, and in addition, the running distance of the developing roller 42 is not corrected.

Specifically, although a filming condition of the developing roller 42 is good, half of the developing roller remaining life GJ was consumed as the running distance of the developing roller 42 in the mono mode, and the number of possible prints became half of the number of total prints. Thus, in a case in which the lifetime determination is made earlier than when an actual filming state of the developing roller 42 reaches a threshold value, the user will be disadvantaged.

Next, in the evaluation mode (2), in the Comparative Example 2, when the developing roller remaining lifetime GJ reached 0%, the number of possible prints became 3000 and the latter half weak concentration occurred. This is because, in the Comparative Example 2, only the contact running distance, which is the running distance of the developing roller 42 in the development contact state, is counted, and the separated running distance, which is the running distance of the developing roller 42 in the development separated state, is not counted. In other words, the running distance of the developing roller 42 in the mono mode was not taken into consideration for the lifetime determination, resulting in the occurrence of the latter half weak concentration due to the progress of the filming of the developing roller 42.

In contrast, in the Embodiment 1, in the evaluation mode (2), the running distance of the developing roller 42 is acquired by taking into consideration the effect of the rubbing of the toner 90 and the effect of the filming of the developing roller 42 in the development contact state and the development separated state, respectively. And the lifetime determination of the developing device 4 is performed based on this running distance of the developing roller 42. As a result, an appropriate lifetime determination can be performed in accordance with the filming state of the developing roller 42 of each developing device 4, even if the developing devices 4Y, 4M and 4C for each color of YMC are driven more often in the development separated state, as in the mono mode. Here, a number of accumulated prints when the developing device 4 is used only in the full color mode and when it is determined that the developing device 4 reaches the end of the lifetime thereof by the total accumulated added running distance Ht exceeding the predetermined threshold value is defined as Pf1. In addition, a number of accumulated prints in the full color mode when the developing device 4 is used so that the usage ratio between the full color mode and the mono mode is 5:5 on average (used so that the each usage ratio is the same on average) and when it is determined that the developing device 4 reaches the end of the lifetime thereof by the total accumulated added running distance Ht exceeding the predetermined threshold value is defined as Pf2. As shown in Table 1, in the Embodiment 1, a relationship of Pf1×0.5<Pf2<Pf1 is satisfied. Incidentally, in the Comparative Example 1 and the Comparative Example 2, the above relationship is not satisfied.

Thus, in the Embodiment 1, the image forming apparatus 100 comprising: the image bearing member (photosensitive drum) 1 configured to bear the developer image; the developing device 4 provided with the developer carrying member 42 configured to rotate while carrying the developer and to form the developer image on the image bearing member 1 by supplying the developer to the image bearing member 1; the moving mechanism (contact/separation mechanism) 130 configured to move the developer carrying member 42 to the first position (contact position) where the developer carrying member 42 and the image bearing member 1 are in contact with each other and to the second position (separated position) which is further away from the image bearing member 1 than the first position; the driving portion 127 configured to be capable of rotating the developer carrying member 42 in either case where the developer carrying member 42 is located in the first position or the second position; the acquiring portion (running distance calculating device) 60 configured to acquire information including the first information (contact running distance) and the second information (separated running distance) on the rotation amount of the developer carrying member 42; and the notifying portion (lifetime determining portion) 81 configured to perform the notification on the lifetime of the developing device 4, wherein the acquiring portion 60 corrects the first information (contact running distance), on the rotation amount of the developer carrying member 42 in the state in which the developer carrying member 42 is located in the first position, to the third information (corrected contact running distance) by using the first correction coefficient (first load correction coefficient) k1, and corrects the second information (separated running distance), on the rotation amount of the developer carrying member 42 in the state in which the developer carrying member 42 is located in the second position, to the fourth information (corrected separated running distance) by using the second correction coefficient (second load correction coefficient) k2 different from the first correction coefficient k1, and wherein the notifying portion 81 performs the notification on the lifetime of the developing device 4 based on the third information and the fourth information. In the Embodiment 1, the acquiring portion 60 includes the first information acquiring portion (contact running distance measuring portion) 61 configured to acquire the first information, the second information acquiring portion (separated running distance measuring portion) 62 configured to acquire the second information, the third information acquiring portion (contact running distance calculating portion) 63 configured to acquire the third information by correcting the first information with the first correction coefficient k1, the fourth information acquiring portion (separated running distance calculating portion) 64 configured to acquire the fourth information by correcting the second information with the second correction coefficient k2, and the fifth information acquiring portion (running distance calculating portion) 65 configured to acquire the fifth information (total accumulated added running distance) on the total rotation amount (total corrected distance) integrating the added rotation amount (added running distance) adding the rotation amount indicated by the third information and the rotation amount indicated by the fourth information, and wherein the notifying portion 81 performs the notification on the lifetime of the developing device 4 based on the fifth information. In the Embodiment 1, the first information acquiring portion 61 acquires the first information based on the rotation amount of the developer carrying member 42 measured in the state in which the developer carrying member 42 is located in the first position. In addition, in the Embodiment 1, the image forming apparatus 100 further comprising the developer amount acquiring portion (developer amount detecting device) 70 configured to acquire the developer amount information on the developer amount in the developing device 4, wherein the notifying portion 81 is capable of performing the notification of the lifetime of the developing device 4 in the case in which the developer remaining amount in the developing device 4 indicated by the developer amount information is equal to or lower than the predetermined threshold value. In addition, in the Embodiment 1, the absolute value of the first correction coefficient k1 is larger than the absolute value of the second correction coefficient k2.

As described above, according to the Embodiment 1, in the configuration in which the developing roller 42 is driven and rotated in the development separated state, an appropriate lifetime notification of the developing device 4 can be performed with performing an appropriate lifetime determination of the developing device 4.

Next, an Embodiment 2 will be described. The basic configuration and operation of the image forming apparatus 100 of the Embodiment 2 are the same as those of the Embodiment 1. Therefore, the elements of the image forming apparatus 100 in the Embodiment 2 that are provided with functions or configurations identical or corresponding to those of the image forming apparatus 100 of the Embodiment 1 are labeled with the same reference numeral as in the Embodiment 1, and detailed descriptions will be omitted.

Filming of the developing roller 42 may vary depending on use environment of the image forming apparatus 100 (atmospheric environment of the image forming apparatus 100). For example, in low temperature and low humidity environment, there is a case that a charge amount of the toner 90 may become higher and an electrostatic adhesion of the toner 90 and the external additive, etc. may become higher. As a result, there is a case that the toner 90 and the external additive, etc. may easily adhere to the developing roller 42 when the developing roller 42 is rubbed against the regulating blade 44, the supplying roller 43, and the photosensitive drum 1.

Therefore, in the Embodiment 2, a first load correction coefficient k1 and a second load correction coefficient k2 are changed according to the temperature and the humidity of the use environment of the image forming apparatus 100, respectively.

<Control Mode>

Figure 9:
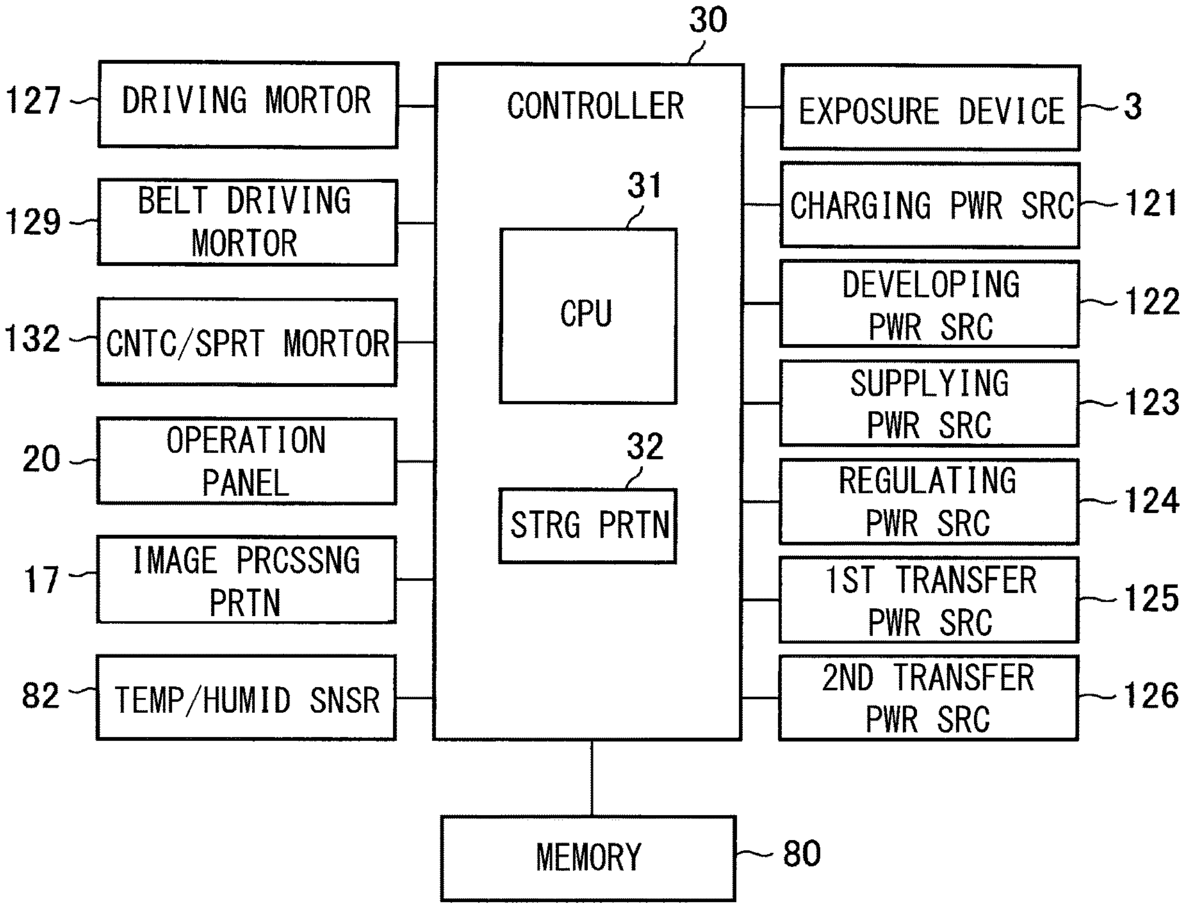
FIG. 9 is a block diagram illustrating an outline of the control mode of the image forming apparatus of an Embodiment 2 and an Embodiment 3.

FIG. 9 is a block diagram illustrating an outline of the control mode of the image forming apparatus 100 of the Embodiment 2. Incidentally, the function blocks of the control portion 30 in the Embodiment 2 are the same as those of the Embodiment 1 shown in FIG. 5.

In the Embodiment 2, the image forming apparatus 100 is provided with a temperature and humidity sensor 82, which is a temperature and humidity detecting portion detecting the temperature and the humidity inside the image forming apparatus 100, as an environment detecting means (environment acquiring portion) for detecting the use environment (environment information) of the image forming apparatus 100. In the Embodiment 2, the control portion 30 calculates an absolute humidity (here, also referred to as an "absolute moisture amount") [g/m$^3$] based on detected results of the temperature and humidity sensor 82 In addition, in the Embodiment 2, the memory 80 being provided to the process cartridge 8 stores the first load correction coefficient k1 and the second load correction coefficient k2, which are set corresponding to levels of the absolute moisture amount.

<Calculation of the Running Distance of the Developing Roller>

Next, a calculation of the running distance of the developing roller 42 in the Embodiment 2 will be described. In the Embodiment 2, the first load correction coefficient k1 (k1*a*, k1*b*) and the second load correction coefficient k2 (k2*a*, k2*b*) were set as shown in Table 2, respectively, corresponding to the levels of the absolute moisture amount. In the Embodiment 2, the information on the first load correction coefficient k1 and the second load correction coefficient k2 as shown in Table 2 is stored in the memory 80 being provided to the process cartridge 8.

TABLE 2

| Absolute moisture amount [g/m$^3$] | First load correction coefficient k1 | Second load correction coefficient k2 |
|---|---|---|
| Lower than 3.0 | k1a = 1.3 | k2a = 0.10 |
| Equal to or higher than 3.0 | k1b = 1.0 | k2b = 0.08 |

First, as in the Embodiment 1, a contact running distance W1 is measured by the contact running distance measuring portion 61, and a separated running distance W2 is measured by the separated running distance measuring portion 62.

Next, the contact running distance calculating portion 63 reads out the first load correction coefficient k1 stored in the memory 80 corresponding to the calculated absolute moisture amount. For example, in a case in which the absolute moisture amount in the use environment of the imaging forming apparatus 100 is lower than 3.0 g/m$^3$, then k1*a* is read out as the first load correction coefficient k1. The contact running distance calculating portion 63 then multiplies the contact running distance W1 by the first load correction coefficient k1 to calculate the corrected contact running distance H1. Specifically, the corrected contact running distance H1 is calculated by the following formula (14).

$$H1 = k1 \times W1 \tag{14}$$

Similarly, the separated running distance calculating portion 64 reads out the second load correction coefficient k2 stored in the memory 80 corresponding to the calculated absolute moisture amount. For example, in the case in which the absolute moisture amount in the use environment of the imaging forming apparatus 100 is lower than 3.0 g/m$^3$, then k2*a* is read out as the second load correction coefficient k2. Then, the separated running distance calculating portion 64 multiplies the separated running distance W2 by the second load correction coefficient k2 to calculate the corrected separated running distance H2. Specifically, the corrected separated running distance H2 is calculated by the following formula (15).

$$H2 = k2 \times W2 \tag{15}$$

The calculations of the added running distance H and the total accumulated added running distance Ht in the running distance calculating portion 65, and the calculation of the developing roller remaining life GJ and the updating of the accumulated added running distance Hr in the lifetime determining portion 81 are the same as in the Embodiment 1, therefore the description will be omitted.

As described above, in the Embodiment 2, the first load correction coefficient k1 and the second load correction coefficient k2 are changed according to the temperature and the humidity of the use environment of the image forming apparatus 100, respectively. By this, it becomes possible to count the running distance of the developing roller 42 in accordance with the progress of the filming of the developing roller 42 in the use environment of the image forming apparatus 100.

Incidentally, in the Embodiment 2, the relationship among the absolute moisture amount, the first load correction coefficient k1 and the second load correction coefficient k2 as shown in Table 2 are used, however, it is not limited to this configuration. For example, the levels of the absolute moisture amount may be subdivided into smaller levels than those shown in Table 2, and different first load correction coefficient k1 and second load correction coefficient k2 may be set in each level.

In addition, in the Embodiment 2, the absolute moisture amount is used as an indicator of the use environment of the image forming apparatus 100, however, it is not limited to this configuration. For example, it may be configured as the first load correction coefficient k1 and the second load correction coefficient k2 are obtained corresponding to levels of the temperature or the humidity detected by the temperature and humidity sensor 82. The use environment of the image forming apparatus 100 (atmospheric environment of the image forming apparatus 100) may be at least one of the temperature or the humidity of at least one of an inside or an outside of the image forming apparatus 100, as long as there is a correlation with the progress of the filming of the developing roller 42.

<Lifetime Determination Sequence of the Developing Device>

Figure 10:
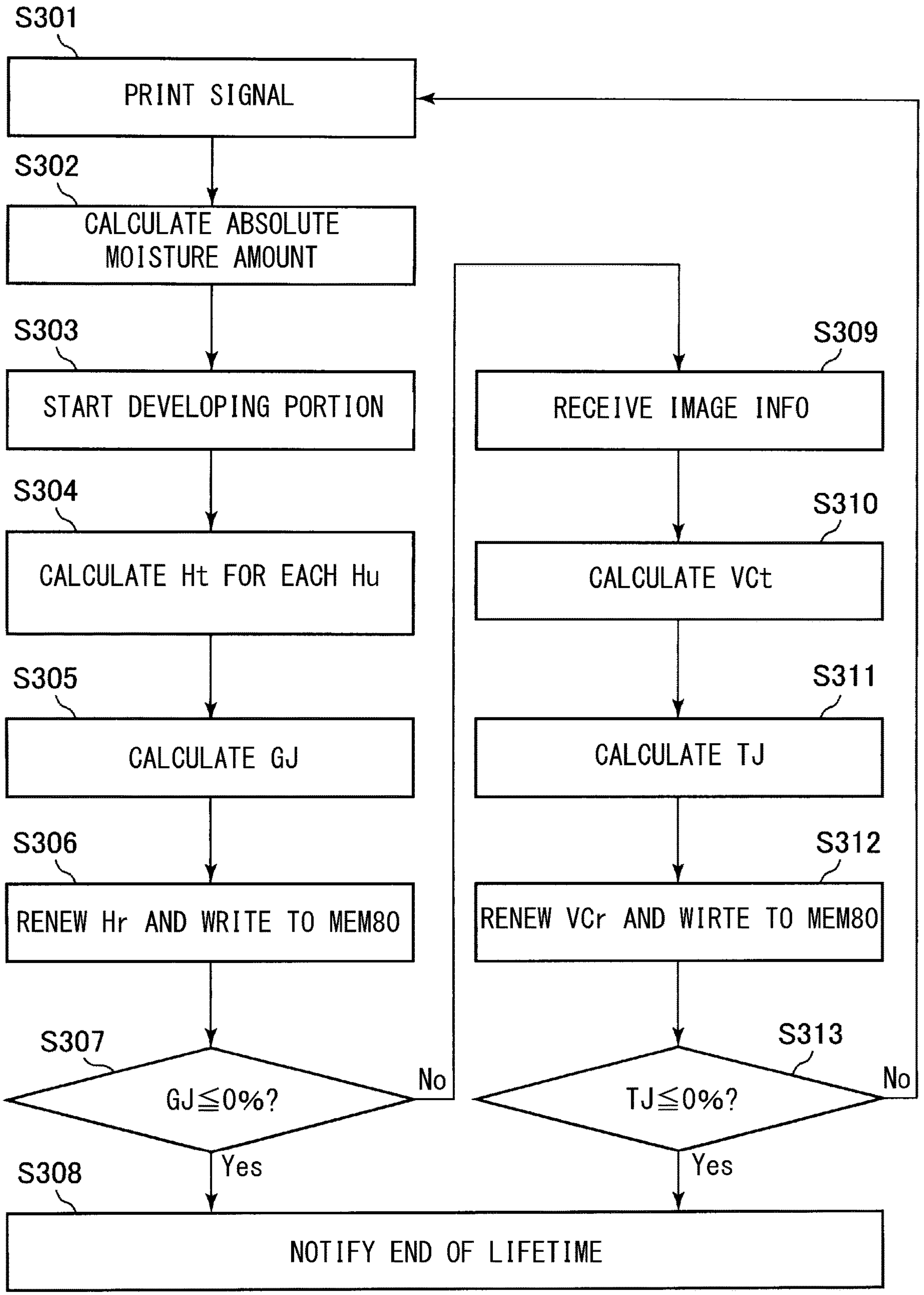
FIG. 10 is a flowchart diagram of the lifetime determination sequence in the Embodiment 2.

Next, a lifetime determination sequence of the developing device 4 in the Embodiment 2 will be described. FIG. 10 is a flowchart diagram of the lifetime determination sequence of the developing device 4 in the Embodiment 2. The control portion 30 can perform the lifetime determination of the developing device 4 by performing each of processes shown in FIG. 10 based on information in the memory 80 being provided to the process cartridge 8, and notify the result to the user.

First, when the print signal (start signal, image signal) is sent to the image forming apparatus 100 (S301), the control portion 30 calculates the absolute moisture amount of the use environment of the image forming apparatus 100 (S302) based on the detected result of the temperature and humidity sensor 82. The control portion 30 then drives the developing portion 4 to start the image forming operation (S303).

Next, for each predetermined added running distance Hu, the control portion 30 calculates the total accumulated added running distance Ht by adding (integrating) the distance Hu to the accumulated added running distance Hr stored in the memory 80 in the running distance calculating portion 65 (S304). The control portion 30 then calculates the developing roller remaining lifetime GJ (S305) and writes the total accumulated added running distance Ht to the memory 80 as a new accumulated added running distance Hr (S306).

Next, the control portion 30 determines whether or not the developing roller remaining lifetime GJ is equal to or lower than 0% (predetermined remaining lifetime threshold value) (S307). If the control portion 30 determines that the developing roller remaining lifetime GJ is equal to or lower than 0%, then the control portion 30 notifies the user by displaying the notification on the operating panel 20 being provided to the apparatus main body 110 that the developing device 4 has reached the end of the lifetime thereof (S308). On the other hand, if the control portion 30 determines that the developing roller remaining lifetime GJ is not equal to or lower than 0% (greater than 0%), then the control portion 30 proceeds to S309.

The processes of steps from S309 to S313 are the same as those of S108 to S112 in FIG. 6 in the Embodiment 1, therefore the description will be omitted.

Thus, in the Embodiment 2, the image forming apparatus 100 further comprising the environment acquiring portion (temperature and humidity sensor) 82 configured to acquire the environment information on the atmospheric environment of the image forming apparatus 100, wherein the notifying portion 81 performs the notification on the lifetime of the developing device 4 based on the third information (corrected contact running distance) and the fourth information (corrected separated running distance) to which the acquiring portion 60 corrects the first information (contact running distance) and the second information (separated running distance) according to the environment information, respectively. In particular, in the Embodiment 2, the third information acquiring portion (contact running distance acquiring portion) 63 acquires the third information by correcting the first information by using the first correction coefficient k1 corresponding to the environment information, and the fourth information acquiring portion (separated running distance calculating portion) 64 acquires the fourth information by correcting the second information by using the second correction coefficient k2 corresponding to the environment information.

As described above, in the Embodiment 2, the first load correction coefficient k1 and the second load correction coefficient k2 are changed according to the temperature and humidity of the use environment of the image forming apparatus 100, respectively. As a result, in the Embodiment 2, the same effect as in the Embodiment 1 can be obtained and an appropriate lifetime determination can be performed in accordance with the progress of the filming of the developing roller 42 in the use environment of the image forming apparatus 100. In other words, in the Embodiment 2, more appropriate lifetime determination for each developing device 4 can be performed by taking into consideration the use environment of the image forming apparatus 100, even if the developing devices 4Y, 4M and 4C for each color of YMC are driven more often in the development separated state, as in the mono mode.

Next, an Embodiment 3 will be described. The basic configuration and operation of the image forming apparatus 100 of the Embodiment 3 are the same as those of the Embodiment 1 and the Embodiment 2. Therefore, elements of the image forming apparatus 100 in the Embodiment 3 that are provided with functions or configurations identical or corresponding to those of the image forming apparatus 100 of the Embodiment 1 and the Embodiment 2 are labeled with the same reference numeral as in the Embodiment 1 and the Embodiment 2, and detailed descriptions will be omitted.

As the toner remaining amount in the developing device 4 decreases with the use of the image forming apparatus 100, opportunity for the same toner 90 to be rubbed repeatedly increases, therefore it becomes easier for the filming of the developing roller 42 to progress.

Therefore, in the Embodiment 3, the added running distance H of the developing roller 42 is corrected by using a third load correction coefficient (third correction coefficient) k3 corresponding to the toner remaining amount in the developing device 4.

<Calculation of the Running Distance of the Developing Roller>

Next, a calculation of the running distance of the developing roller 42 in the Embodiment 3 will be described. In the Embodiment 3, the running distance calculating portion 65 corrects the added running distance H of the developing roller 42 by using the third load correction coefficient k3 corresponding to the toner remaining amount in the developing device 4. In the Embodiment 3, the third load correction coefficient k3 (from k31 to k36) are set as shown in Table 3, corresponding to the toner remaining amount TJ in the developing device 4. Specifically, the toner remaining amount in the developing device 4 is leveled into multiple ranges, and one set value of the third load correction coefficient k3 is assigned to one level. In addition, the third load correction coefficient k3 in one level is configured to be constant. In the Embodiment 3, the information on the third load correction coefficient k3, as shown in Table 3, is stored in the memory 80 being provided to the process cartridge 8.

TABLE 3

| Toner remaining amount TJ | Third load correction coefficient k3 |
|---|---|
| 100%-61% | k31 = 1.0 |
| 60%-41% | k32 = 1.0 |
| 40%-31% | k33 = 3.0 |
| 30%-21% | k34 = 3.4 |
| 20%-11% | k35 = 3.6 |
| 10%-0% | k36 = 4.0 |

First, as in the Embodiment 1 and the Embodiment 2, the corrected contact running distance H1 and the corrected separated running distance H2 are calculated by the contact running distance calculating portion 63 and the separated running distance calculating portion 64, respectively.

Next, the running distance calculating portion 65 adds the corrected contact running distance H1 and the corrected separated running distance H2 to obtain the added running distance H. Specifically, the added running distance H is calculated by the following formula (16).

$$H = H1 + H2 \quad (16)$$

Then, in the Embodiment 3, the running distance calculating portion 65, each time the added running distance H increases by the predetermined distance Hu, refers to the toner remaining amount TJ calculated by the developer amount detecting device 70 and reads out the third load correction coefficient k3 stored in the memory 80 corresponding to the toner remaining amount TJ. For example, if the toner remaining amount TJ in the developing device 4 is 35%, then k33 is read out as the third load correction coefficient k3. In addition, in the Embodiment 3, the predetermined added running distance Hu is set to be approximately 2 sheets of A4 size sheet (approximately 300 mm).

Next, the running distance calculating portion 65 multiplies the predetermined added running distance Hu by the third load correction coefficient k3 to calculate the corrected added running distance (corrected added rotation amount) Hs. Specifically, the corrected added running distance Hs is calculated by the following formula (17).

$$Hs = k3 \times Hu \quad (17)$$

Furthermore, the running distance calculating portion 65 adds (integrates) the obtained corrected added running distance Hs to the accumulated added running distance Hr from the beginning of use of the developing device 4 (process cartridge 8) stored in the memory 80 to calculate the total accumulated added running distance Ht, which is the total corrected distance. Specifically, the total accumulated added running distance Ht is calculated by the following formula (18).

$$Ht = Hr + Hs \quad (18)$$

Next, the lifetime determining portion 81 calculates the developing roller remaining lifetime GJ based on the running distance threshold value Wth stored in the memory 80 and the total accumulated added running distance Ht. Specifically, the developing roller remaining lifetime GJ is calculated by the following formula (19).

$$GJ\ [\%] = (1 - Ht/Wth) \times 100 \quad (19)$$

The lifetime determining portion 81 then writes (updates) the obtained total accumulated added running distance Ht to the memory 80 as a new accumulated added running distance Hr.

As described above, in the Embodiment 3, the added running distance H of the developing roller 42 is corrected by using the third load correction coefficient k3 corresponding to the toner remaining amount in the developing device 4. By this, it becomes possible to count the running distance of the developing roller 42 with taking into consideration of the effect of the filming on the developing roller 42 when the toner remaining amount in the developing device 4 becomes low. Specifically, the third load correction coefficient k3 is set so that progress of the running distance of the developing roller 42 becomes faster as the toner remaining amount in the developing device 4 decreases, since the opportunity for the same toner 90 to be rubbed repeatedly increases.

As described above, in the Embodiment 3, the value of the third load correction coefficient k3 is set so that the lower the toner remaining amount, the larger the value of k3. However, it is not limited to this configuration. For example, the same third load correction coefficient k3 may be set for multiple levels, or the third load correction coefficient k3 may be set to become smaller in the middle of a decrease in the toner remaining amount. This is because, depending on a configuration of the developing device 4, circulation of the toner 90 may be better in a certain range of the toner remaining amount, and the effect due to the decrease of the toner remaining amount may be mitigated.

In addition, in the Embodiment 3, the relationship between the toner remaining amount TJ and the third load correction coefficient k3 is used as shown in Table 3, however, it is not limited to this configuration. For example, the levels of the toner remaining amount TJ may be subdivided into smaller levels than those shown in Table 3, and a different third load correction coefficient k3 may be set for each level, or conversely, levels of the toner remaining amount TJ may be lessened.

In addition, in the Embodiment 3, the third load correction coefficient k3 is set to equal to or higher than 1.0, however, it is not limited to this configuration. The degree of progression of the filming of the developing roller 42 varies depending, for example, on the use environment of the image forming apparatus 100, the physical properties and the shapes of the toner 90, and the types, the shapes or the amount of the additives, etc., therefore the set value of the third load correction coefficient k3 may be less than 1.0.

<Lifetime Determination Sequence of the Developing Device>

Figure 11:
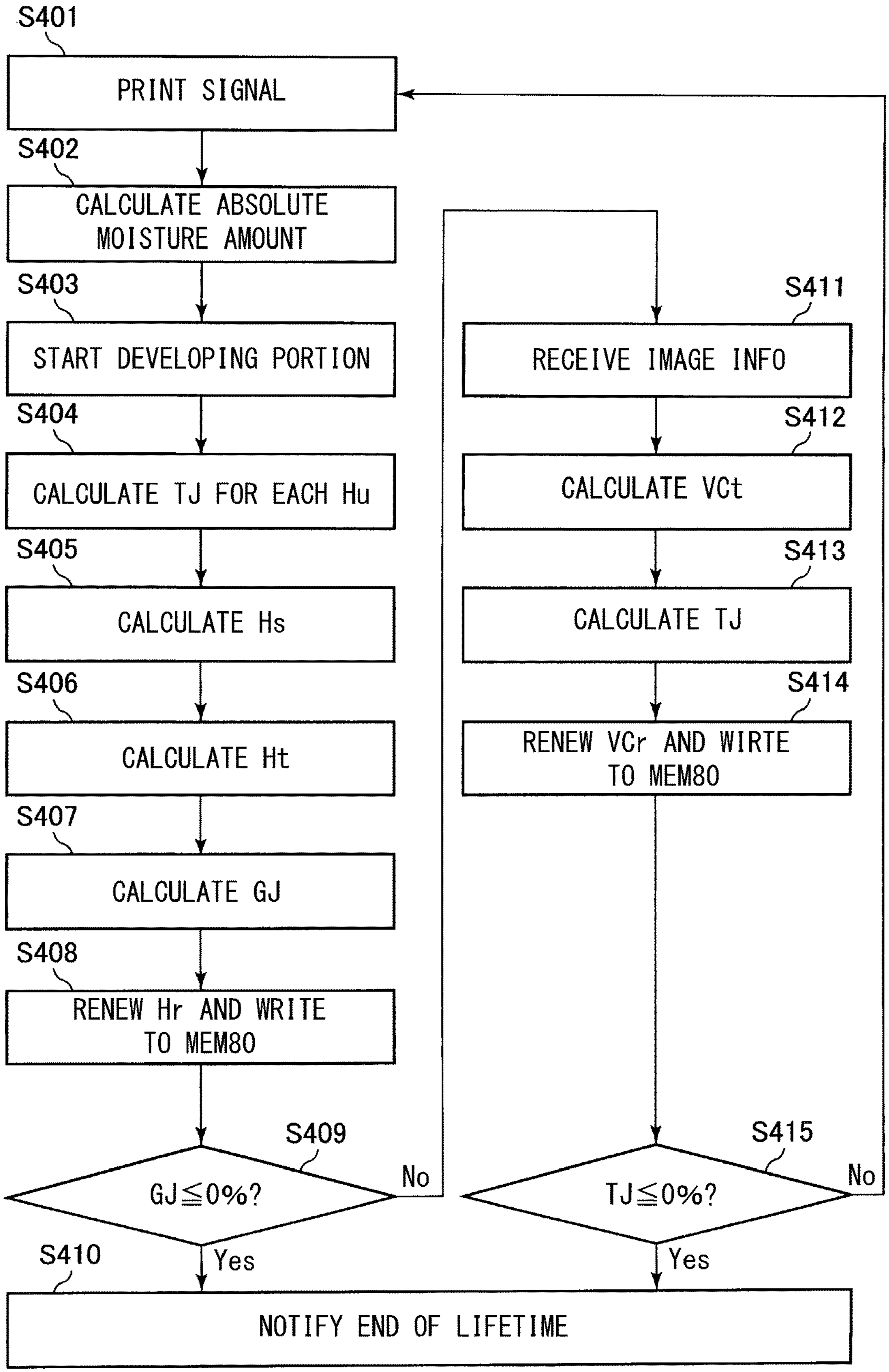
FIG. 11 is a flowchart diagram of the lifetime determination sequence in the Embodiment 3.

Next, a lifetime determination sequence of the developing device 4 in the Embodiment 3 will be described. FIG. 11 is a flowchart diagram of the lifetime determination sequence of the developing device 4 in the Embodiment 3. The control portion 30 can perform the lifetime determination of the developing device 4 by performing each of processes shown in FIG. 11 based on information in the memory 80 being provided to the process cartridge 8, and notify the result to the user.

First, when a print signal (start signal, image signal) is sent to the image forming apparatus 100 (S401), the control portion 30 calculates the absolute moisture amount of the use environment of the image forming apparatus 100 (S402) based on the detected result from the temperature and humidity sensor 82. The control portion 30 then drives the developing portion 4 to start the image forming operation (S403).

Next, for each predetermined added running distance Hu, the control portion 30, in the running distance calculating portion 65, refers to the toner remaining amount TJ calculated by the developer amount detecting device 70 and reads out the third load correction coefficient k3 stored in the memory 80 corresponding to the toner remaining amount TJ (S404). The control portion 30, in the running distance calculating portion 65, then multiplies the predetermined added running distance Hu by the third load correction coefficient k3 to calculate the corrected added running distance Hs (S405). In addition, the control portion 30 adds (integrates) the obtained corrected added running distance Hs to the accumulated added running distance Hr stored in the memory 80 to calculate the total accumulated added running distance Ht (S406). Furthermore, the control portion 30 calculates the developing roller remaining lifetime GJ (S407) and writes the total accumulated added running distance Ht to the memory 80 as a new accumulated added running distance Hr (S408).

Next, the control portion 30 determines whether or not the developing roller remaining lifetime GJ is equal to or lower than 0% (predetermined remaining lifetime threshold value) (S409). If the control portion 30 determines that the developing roller remaining lifetime GJ is equal to or lower than 0%, then the control portion 30 notifies the user by displaying the notification on the operating panel 20 being provided to the apparatus main body 110 that the developing device 4 has reached the end of the lifetime thereof (S410). On the other hand, if the control portion 30 determines that the developing roller remaining lifetime GJ is not equal to or lower than 0% (greater than 0%), then the control portion 30 proceeds to S411.

The processes of steps from S411 to S415 are the same as those of S108 to S112 in FIG. 6 in the Embodiment 1, therefore the description will be omitted.

Thus, in the Embodiment 3, the notifying portion 81 performs the notification on the lifetime of the developing device 4 based on the third information (corrected contact running distance) and the fourth information (corrected separated running distance) to which the acquiring portion 60 corrects the first information (contact running distance) and the second information (separated running distance) according to the developer amount information, respectively. In particular, in the Embodiment 3, the fifth information acquiring portion (running distance calculation portion) 65 acquires the fifth information (total accumulated added running distance) by integrating the corrected added rotation amount correcting the added rotation amount (added running distance) by using the third correction coefficient (third load correction coefficient) k3 corresponding to the developer amount information.

As described above, in the Embodiment 3, the added running distance H of the developing roller 42 is corrected by using the third load correction coefficient k3 corresponding to the toner remaining amount in the developing device 4. By this, it becomes possible to perform an appropriate lifetime determination in accordance with the progress of the filming of the developing roller 42, even when the toner remaining amount in the developing device 4 decreases with use of the image forming apparatus 100. In other words, in the Embodiment 3, it becomes possible to perform a more appropriate lifetime determination by taking into consideration the toner remaining amount in the developing device 4, even when the developing devices 4Y, 4M and 4C for each color of YMC are driven more often in the development separated state, as in the mono mode.

Incidentally, in the Embodiment 3, the third load correction coefficient k3 was not changed corresponding to the use environment of the image forming apparatus 100, however, it is not limited to this configuration. For example, the third load correction coefficient k3 may be changed corresponding to the absolute moisture amount calculated from the detected result of the temperature and humidity sensor 82, the temperature or the humidity detected by the temperature and humidity sensor 82. Specifically, for example, the third load correction coefficient k3, which is set corresponding to the toner remaining amount TJ in the developing device 4 and the levels of the absolute moisture amount described above, may be stored in the memory 80 being provided to the process cartridge 8. Then, the running distance calculating portion 65, each time the added running distance H increases by the predetermined distance Hu, reads out the third load correction coefficient k3 stored in the memory 80 by referring to the toner remaining amount TJ calculated by the developer amount detecting device 70 and the absolute moisture amount calculated from the detected result of the temperature and humidity sensor 82. Next, the running distance calculating portion 65 multiplies the predetermined added running distance Hu by the third load correction coefficient k3 to calculate the corrected added running distance Hs.

In addition, in the Embodiment 3, by performing the correction using the third load correction coefficient k3, as the toner remaining amount in the developing device 4 decreases, an advancement of the running distance of the developing roller 42 becomes faster apparently, and an advancement of the developing roller remaining life GJ also becomes faster. In this case, correction may be made by using known methods so that the developing roller remaining lifetime GJ decreases at a constant rate without changing abruptly. For this purpose, for example, the method described in Patent Application Laid-Open No. 2016-161645 may be applied. According to this, when the developing roller remaining lifetime GJ reaches 0%, a pre-corrected developing roller remaining lifetime WGJ is estimated by using the total running distance, which is not corrected by the third load correction coefficient k3, and the developing roller remaining lifetime GJ is corrected.

Next, an Embodiment 4 will be described. In the Embodiment 4, several Modified Examples (Modified Examples 1 through 4) of the image forming apparatus 100 of the Embodiments 1 through 3 will be described. The basic configurations and operations of the image forming apparatus 100 of each Modified Example are the same as those of the Embodiments 1 through 3. Therefore, elements of the image forming apparatus of each Modified Example that are provided with functions or configurations identical or corresponding to those of the image forming apparatus 100 of Embodiments 1 through 3 will be labeled with the same reference numeral as in the Embodiment 1, and detailed descriptions will be omitted.

A Modified Example 1 will be described. An image forming apparatus 100 of the Modified Example 1 is similar to the image forming apparatus 100 of the Embodiments 1 through 3 except for points described hereinafter.

In the Modified Example 1, set values of the first load correction coefficient (k1*a*, k1*b*) and the second load correction coefficient (k2*a*, k2*b*) are configured to be all negative values, as shown in Table 4. In the Modified Example 1, the information on the first load correction coefficient (first correction coefficient) k1 and the second load correction coefficient (second correction coefficient) k2, as shown in Table 4, are stored in the memory 80 being provided to the process cartridge 8. As shown in Table 4, in the Modified Example 1, an absolute value of the first correction coefficient is greater than an absolute value of the second correction coefficient.

TABLE 4

| Absolute moisture amount [g/m$^3$] | First load correction coefficient k1 | Second load correction coefficient k2 |
|---|---|---|
| Lower than 3.0 | k1a = −1.3 | k2a = −0.10 |
| Equal to or higher than 3.0 | k1b = −1.0 | k2b = −0.08 |

In this case, the same processes as in the Embodiments 1 through 3 should be performed in the running distance calculating portion 65, each time an absolute value of an obtained added running distance Hu increases by a predetermined distance Hu (each time an added running distance Hu decreases by a predetermined distance Hu). Incidentally, in the Modified Example 1, the predetermined added running distance Hu is set to be approximately 2 sheets of A4 size sheet (approximately 300 mm). In the Modified Example 1, for example, subtracting the running distance of the developing roller 42 from the running distance of the developing roller 42 equivalent to the lifetime thereof, and when the running distance of the developing roller 42 becomes equal to or lower than a predetermined remaining running distance threshold value (e.g., zero), the life determination of the developing device 4 can be performed.

Thus, even in a case in which the set values of the first load correction coefficient and the second load correction coefficient are all negative, the same effects as in the Embodiments 1 through 3 can be obtained.

A Modified Example 2 will be described. An image forming apparatus 100 of the Modified Example 2 is similar to the image forming apparatus 100 of the Embodiments 1 through 3, except for points described hereinafter.

In the Modified Example 2, a contact running distance W1 is calculated by subtracting a separated running distance W2 from a running distance W regardless of whether in the development contact state or in the development separated state.

In the Modified Example 2, the contact running distance measuring portion 61 measures the running distance W based on the driving time Td of the developing device 4, the process speed Ps of the image forming apparatus 100, and the development peripheral speed ratio Sr. Here, in the Modified Example 2, the running distance W is a distance (surface movement distance) which represents how far a certain point on the surface of the developing roller 42 advances (moves) by the rotation of the developing roller 42, regardless of whether the developing roller 42 is in the development contact state or the development separated state. Specifically, the running distance W is calculated by the following formula (20).

$$W = Td \times Ps \times Sr \tag{20}$$

Then, in the Modified Example 2, the contact running distance measuring portion 61 calculates the contact running distance W1 by subtracting the separated running distance W2 of the developing roller 42 calculated by the separated running distance measuring portion 62 from the running distance W. Specifically, the contact running distance W1 is calculated by the following formula (21).

$$W1 = W - W2 \tag{21}$$

Since the subsequent processes are the same as in the Embodiments 1 through 3, the description will be omitted.

Thus, in the Modified Example 2, the first information acquiring portion (contact running distance measuring portion) 61 acquires the first information (contact running distance) based on the rotation amount of the developer carrying member 42 measured regardless of whether the developer carrying member 42 is located in the first position (contact position) or the second position (separated position) and the rotation amount of the developer carrying member 42 measured in the state in which the developer carrying member 42 is located in the second position (separated position). Also in this configuration, the same effects as in the Embodiments 1 through 3 can be obtained.

A Modified Example 3 will be described. An image forming apparatus 100 of the Modified Example 3 is the same as the image forming apparatus 100 of the Embodiment 2 and the Embodiment 3, except for points described hereinafter.

In the Modified Example 3, an environment correction coefficient z, which is set corresponding to the levels of the absolute moisture amount, is used to perform an environment correction for the first load correction coefficient k1 and the second load correction coefficient k2, respectively.

In the Modified Example 3, the environment correction coefficient z (za, zb) is set as shown in Table 5, corresponding to the levels of the absolute moisture amount. In the Modified Example 3, information of the environment correction coefficient z as shown in Table 5 is stored in the memory 80 being provided to the process cartridge 8.

TABLE 5

| Absolute moisture amount [g/m$^3$] | Environment correction coefficient z |
|---|---|
| Lower than 3.0 | za = 1.3 |
| Equal to or higher than 3.0 | zb = 1.0 |

First, as in the Embodiment 2 and the Embodiment 3, a contact running distance W1 is measured in the contact running distance measuring portion 61, and a separated running distance W2 is measured in the separated running distance measuring portion 62.

Next, the contact running distance calculating portion 63 reads out the first load correction coefficient k1 stored in the memory 80, and also reads out the environment correction coefficient z stored in the memory 80 corresponding to the calculated absolute moisture amount. For example, in a case in which the absolute moisture amount in the use environment of the imaging forming apparatus 100 is lower than 3.0 g/m³, then za is read out as the environment correction coefficient. The contact running distance calculating portion 63 then multiplies the contact running distance W1 by the first load correction coefficient k1 and the environment correction coefficient z to calculate the corrected contact running distance H1. Specifically, the corrected contact running distance H1 is calculated by the following formula (22).

$$H1 = k1 \times z \times W1 \quad (22)$$

Similarly, the separated running distance calculating portion 64 reads out the second load correction coefficient k2 stored in the memory 80, and also reads out the environment correction coefficient z stored in memory 80 corresponding to the calculated absolute moisture amount. The separated running distance calculating portion 64 then multiplies the separated running distance W2 by the second load correction coefficient k2 and the environment correction coefficient z to calculate the corrected separated running distance H2. Specifically, the corrected separated running distance H2 is calculated by the following formula (23).

$$H2 = k2 \times z \times W2 \quad (23)$$

Here, in the Modified Example 3, the first load correction coefficient k1 is set to 1.0 and the second load correction coefficient k2 is set to 0.08.

Since the subsequent processes are the same as in the Embodiment 2 and the Embodiment 3, the description will be omitted.

Thus, in the Modified Example 3, the third information acquiring portion (contact running distance calculating portion) 63 acquires the third information (corrected contact running distance) by correcting the first information (contact running distance) by using the first correction coefficient k1 and the environment correction coefficient z corresponding to the environment information, and the fourth information acquiring portion (separated running distance calculating portion) 64 acquires the fourth information (corrected separated running distance) by correcting the second information (separated running distance) by using the second correction coefficient k2 and the environment correction coefficient z.

Also in this configuration, the same effects as in the Embodiment 2 and the Embodiment 3 can be obtained.

Incidentally, in the Modified Example 3, the environment correction coefficient z as shown in Table 5 is used, however, it is not limited to this configuration. For example, an environment correction coefficient z1 to correct the first load correction coefficient and an environment correction coefficient z2 to correct the second load correction coefficient may be set, respectively. The environment correction coefficient z1 and the environment correction coefficient z2 may be stored in the memory 80, respectively, and read and used corresponding to the calculated absolute moisture amount. Furthermore, the levels of the absolute moisture amount may be subdivided into smaller categories than those shown in Table 5, and different environment correction coefficient z may be set for each level.

In addition, in the Modified Example 3, the absolute moisture amount is used as an indicator of the use environment of the image forming apparatus 100, however, it is not limited to this configuration. For example, it may be a configuration in which the environment correction coefficient z is obtained corresponding to levels of the temperature or the humidity detected by the temperature and humidity sensor 82. A Modified Example 4 will be described. An image forming apparatus 100 of the Modified Example 4 is the same as the image forming apparatus 100 of the Embodiment 3, except for points described hereinafter.

In the Modified Example 4, the first load correction coefficient k1 and the second load correction coefficient k2 are used to correct a contact running distance W1 and a separated running distance W2 of the developing roller 42, respectively, corresponding to the toner remaining amount in the developing device 4. In the Modified Example 4, a first load correction coefficient k1 (k11*a*-k16*a*, k11*b*-k16*b*) and a second load correction coefficient k2 (k21*a*-k26*a*, k21*b*-k26*b*) are set as shown in Table 6, respectively, corresponding to the toner remaining amount TJ in the developing device 4. Specifically, the toner remaining amount in the developing device 4 is leveled into multiple ranges, and set values of the first load correction coefficient and the second load correction coefficient are assigned to each level. In addition, the first load correction coefficient k1 and the second load correction coefficient k2 within a single level should be constant. Incidentally, in the Modified Example 4, the first load correction coefficient k1 and the second load correction coefficient k2 corresponding to the toner remaining amount in the developing device 4 are set corresponding to the absolute moisture amount, respectively. In the Modified Example 4, information of the first load correction coefficient k1 and the second load correction coefficient k2, as shown in Table 6, is stored in the memory 80 being provided to the process cartridge 8.

TABLE 6

| Absolute moisture amount [g/m³] | Toner remaining amount TJ | First load correction coefficient k1 | Second load correction coefficient k2 |
|---|---|---|---|
| Lower than 3.0 | 100%-61% | k11a = 1.3 | k21a = 0.10 |
| | 60%-41% | k12a = 1.3 | k22a = 0.10 |
| | 40%-31% | k13a = 3.9 | k23a = 0.31 |
| | 30%-21% | k14a = 4.4 | k24a = 0.35 |
| | 20%-11% | k15a = 4.6 | k25a = 0.37 |
| | 10%-0% | k16a = 5.2 | k26a = 0.41 |
| Equal to or higher than 3.0 | 100%-61% | k11b = 1.0 | k21b = 0.08 |
| | 60%-41% | k12b = 1.0 | k22b = 0.08 |
| | 40%-31% | k13b = 3.0 | k23b = 0.24 |
| | 30%-21% | k14b = 3.4 | k24b = 0.27 |
| | 20%-11% | k15b = 3.6 | k25b = 0.29 |
| | 10%-0% | k16b = 4.0 | k26b = 0.32 |

First, as in the Embodiment 3, the contact running distance measuring portion 61 measures the contact running distance W1, and the separated running distance measuring portion 62 measures the separated running distance W2.

Next, the contact running distance calculating portion 63 refers to the toner remaining amount TJ calculated by the developer amount detecting device 70 and the absolute moisture amount, which is separately calculated, and reads out the first load correction coefficient k1 stored in the memory 80. For example, in a case in which the toner remaining amount TJ in the developer device 4 is 35% and the absolute moisture amount of the use environment of the image forming apparatus 100 is equal to or higher than 3.0 g/m³, then k13*b* is read out as the first load correction coefficient k1. The contact running distance calculating portion 63 then multiplies the contact running distance W1 by the first load correction coefficient k1 to calculate the corrected contact running distance H1. Specifically, the corrected contact running distance H1 is calculated by the following formula (24).

$$H1 = k1 \times W1 \quad (24)$$

Similarly, the separated running distance calculating portion 64 refers to the toner remaining amount TJ calculated by the developer amount detecting device 70 and the absolute moisture amount, which is separately calculated, and reads out the second load correction coefficient k2 stored in the memory 80. For example, in the case in which the toner remaining amount TJ in the developer device 4 is 35% and the absolute moisture amount of the use environment of the image forming apparatus 100 is equal to or higher than 3.0 $g/m^3$, then k23*b* is read out as the second load correction coefficient k2. Then, the separated running distance calculating portion 64 multiplies the separated running distance W2 by the second load correction coefficient k2 to calculate the corrected separated running distance H2. Specifically, the corrected separated running distance H2 is calculated by the following formula (25).

$$H2 = k2 \times W2 \quad (25)$$

Next, the running distance calculating portion 65 adds the corrected contact running distance H1 and the corrected separated running distance H2 to obtain the added running distance H. Specifically, the added running distance H is calculated by the following formula (26).

$$H = H1 + H2 \quad (26)$$

Furthermore, the distance calculating portion 65, each time the obtained added running distance H increases by a predetermined distance Hu, adds (integrates) the above predetermined added running distance Hu to the accumulated added running distance Hr, which is stored in the memory 80 and is accumulated from the beginning of use of the developing device 4 (process cartridge 8), to calculate the total accumulated added running distance Ht. Specifically, the total accumulated added running distance Ht is calculated by the following formula (27).

$$Ht = Hr + Hu \quad (27)$$

In the Modified Example 4, the above predetermined added running distance Hu is set to be approximately 2 sheets of A4 size sheet (approximately 300 mm).

Since the subsequent processes are the same as in the Embodiment 3, the description will be omitted.

Thus, in the Modified Example 4, the third information acquiring portion (contact running distance calculating portion) 63 acquires the third information (corrected contact running distance) by correcting the first information (contact running distance) by using the first correction coefficient k1 corresponding to the developer amount information, and the fourth information acquiring portion (separated running distance calculating portion) 64 acquires the fourth information (corrected separated running distance) by correcting the second information (separated running distance) by using the second correction coefficient k2 corresponding to the developer amount information.

Also in this configuration, the same effects as in the Embodiment 3 can be obtained.

As described above, the present invention has been described according to the specific Embodiments, however, the present invention is not limited to the above Embodiments.

The notification of information to the operator is not limited to displaying messages, etc. on the display portion. For example, it may be performed by generating warning sounds or voices with a sound generating (voice generating) portion, by lighting or blinking of light with a light emitting portion, etc.

In addition, the display or the input that are assumed to be performed on the operating panel in the above description may be performed on the external device connected communicably to the image forming apparatus.

In addition, the information that is assumed to be stored in the memory which is attachable to and removable from the apparatus main body along with the developing device in the above description may be stored in a storage portion provided to the apparatus main body.

In addition, in the Embodiment 2, the Embodiment 3, the Modified Example 1, the Modified Example 3 and the Modified Example 4, the correction coefficients were set based on an assumption that filming of the developing roller progresses more easily in a low temperature and low humidity environment than in a high temperature and high humidity environment. However, it is not limited to the case, but depending on a configuration of the developing device and the characteristics of the toner and the external additives, there may be cases in which filming of the developing roller progresses more easily in the high temperature and high humidity environment than in the low temperature and low humidity environment. In this case, the absolute value of the correction coefficient can be set to be larger in the high temperature and high humidity environment than in the low temperature and low humidity environment.

In addition, the present invention can be adopted, for example, to a monochrome image forming apparatus having only one developing device, as long as the image forming apparatus includes a configuration in which the developer carrying member is driven in the development separated state.

In addition, in the Embodiments described above, the developing device is configured to be able to make the developer carrying member be in contact with and separated from the image bearing member, however, it is not limited to this configuration. The image forming apparatus need only have a configuration in which a moving mechanism, which moves the developer carrying member to a first position in which the developer carrying member is in contact with the image bearing member and a second position which is further away from the image bearing member than the first position, is provided, and the developer carrying member is driven and rotated in a state positioned in the second position. In addition, in the second position, the developer carrying member and the image bearing member may be in contact with each other as far as a penetration amount or contact pressure between the developer carrying member and the image bearing member is smaller in the second position than in the first position. Therefore, the second position is a position in which the effect of the filming to the developer carrying member is smaller than in the first position. In addition, the developing device is not limited to what uses the non-magnetic one-component developer as the developer, but also may be what uses a magnetic one-component developer, a two-component developer provided with the toner and a carrier, etc.

In addition, in the Embodiments described above, a configuration in which the driving motor (driving portion, driving source) is common to the image bearing member and the developer carrying member, however, the image bearing member and the developer carrying member may be driven by separate driving motors (driving portions, driving sources).

According to the present invention, in configurations in which the developer carrying member is driven and rotated in the development separated state, it is possible to perform an appropriate lifetime notification of the developing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-002751, filed Jan. 11, 2023, which is hereby incorporated by reference herein in its entirety.

What is claimed is:

1. An image forming apparatus comprising:

an image bearing member configured to bear a developer image;

a developing unit provided with a developer carrying member configured to rotate while carrying a developer and to form the developer image on the image bearing member by supplying the developer to the image bearing member;

a moving unit configured to move the developer carrying member to a first position where the developer carrying member and the image bearing member are in contact with each other and to a second position which is further away from the image bearing member than the first position;

a driving portion configured to be capable of rotating the developer carrying member in either case where the developer carrying member is located in the first position or the second position;

an acquiring portion configured to acquire information including first information and second information on a rotation amount of the developer carrying member; and a notifying portion configured to perform a notification on a lifetime of the developing unit, wherein the acquiring portion corrects the first information, on the rotation amount of the developer carrying member in a state in which the developer carrying member is located in the first position, to a third information by using a first correction coefficient, and corrects the second information, on the rotation amount of the developer carrying member in a state in which the developer carrying member is located in the second position, to a fourth information by using a second correction coefficient different from the first correction coefficient, and wherein the notifying portion performs the notification on the lifetime of the developing unit based on the third information and the fourth information.

2. The image forming apparatus according to claim 1, wherein the acquiring portion includes a first information acquiring portion configured to acquire the first information, a second information acquiring portion configured to acquire the second information, a third information acquiring portion configured to acquire the third information by correcting the first information with the first correction coefficient, a fourth information acquiring portion configured to acquire the fourth information by correcting the second information with the second correction coefficient, and a fifth information acquiring portion configured to acquire a fifth information on a total rotation amount integrating an added rotation amount adding a rotation amount indicated by the third information and a rotation amount indicated by the fourth information, and wherein the notifying portion performs the notification on the lifetime of the developing unit based on the fifth information.

3. The image forming apparatus according to claim 2, wherein the first information acquiring portion acquires the first information based on a rotation amount of the developer carrying member measured in the state in which the developer carrying member is located in the first position.

4. The image forming apparatus according to claim 2, wherein the first information acquiring portion acquires the first information based on the rotation amount of the developer carrying member measured regardless of whether the developer carrying member is located in the first position or the second position and the rotation amount of the developer carrying member measured in the state in which the developer carrying member is located in the second position.

5. The image forming apparatus according to claim 2, further comprising an environment acquiring portion configured to acquire environment information on an atmospheric environment of the image forming apparatus, wherein the third information acquiring portion acquires the third information by correcting the first information by using the first correction coefficient corresponding to the environment information, and wherein the fourth information acquiring portion acquires the fourth information by correcting the second information by using the second correction coefficient corresponding to the environment information.

6. The image forming apparatus according to claim 2, further comprising an environment acquiring portion configured to acquire environment information on an atmospheric environment of the image forming apparatus, wherein the third information acquiring portion acquires the third information by correcting the first information by using the first correction coefficient and an environment correction coefficient corresponding to the environment information, and wherein the fourth information acquiring portion acquires the fourth information by correcting the second information by using the second correction coefficient and the environment coefficient.

7. The image forming apparatus according to claim 2, further comprising a developer amount acquiring portion configured to acquire developer amount information on a developer amount in the developing unit, wherein the fifth information acquiring portion acquires the fifth information by integrating a corrected added rotation amount correcting the added rotation amount by using a third correction coefficient corresponding to the developer amount information.

8. The image forming apparatus according to claim 2, further comprising a developer amount acquiring portion configured to acquire developer amount information on a developer amount in the developing unit, wherein the third information acquiring portion acquires the third information by correcting the first information by using the first correction coefficient corresponding to the developer amount information, and wherein the fourth information acquiring portion acquires the fourth information by correcting the second information by using the second correction coefficient corresponding to the developer amount information.

9. The image forming apparatus according to claim 1, further comprising an environment acquiring portion configured to acquire environment information on an atmospheric environment of the image forming apparatus, wherein the notifying portion performs the notification on the lifetime of the developing unit based on the third information and the fourth information to which the acquiring portion corrects the first information and the second information according to the environment information, respectively.

10. The image forming apparatus according to claim 1, further comprising a developer amount acquiring portion configured to acquire developer amount information on a developer amount in the developing unit, wherein the notifying portion performs the notification on the lifetime of the developing unit based on the third information and the fourth information to which the acquiring portion corrects the first information and the second information according to the developer amount information, respectively.

11. The image forming apparatus according to claim 1, further comprising a developer amount acquiring portion configured to acquire developer amount information on a developer amount in the developing unit, wherein the notifying portion is capable of performing the notification of the lifetime of the developing unit in a case in which a developer remaining amount in the developing unit indicated by the developer amount information is equal to or lower than a predetermined threshold value.

12. The image forming apparatus according to claim 1, wherein an absolute value of the first correction coefficient is larger than an absolute value of the second correction coefficient.

13. An image forming apparatus comprising:

a first image bearing member configured to bear a developer image;

a first developing unit provided with a first developer carrying member configured to rotate while carrying a developer and to form the developer image on the first image bearing member by supplying the developer to the first image bearing member;

a second image bearing member configured to bear the developer image;

a second developing unit provided with a second developer carrying member configured to rotate while carrying the developer and to form the developer image on the second image bearing member by supplying the developer to the second image bearing member;

a contact/separation unit configured to move the first developer carrying member to a contact position where the first developer carrying member is in contact with the first image bearing member and to a separated position where the first developer carrying member is separated from the first image bearing member;

a driving portion configured to be capable of rotating the first developer carrying member in either case where the first developer carrying member is located in the contact position or the separated position;

a transfer member configured to transfer the developer image formed on the first image bearing member and the second image bearing member to a recording material; and a notifying portion configured to perform a notification that the first developing unit reaches an end of lifetime thereof based on a rotation amount of the first developer carrying member, wherein the image forming apparatus is capable of executing a print operation transferring the developer image onto the recording material in a first image forming mode in which the first developer carrying member rotates in a state in contact with the first image bearing member, the second developer carrying member rotates in a state in contact with the second image bearing member and the developer image is formed on the first image bearing member and the second image bearing member, and in a second image forming mode in which the first developer carrying member rotates in a state separated from the first image bearing member, the second developer carrying member rotates in a state in contact with the second image bearing member and the developer image is formed on the second image bearing member of the first image bearing member and the second image bearing member, and wherein a number of accumulated prints is defined as Pf1 when the image forming apparatus executes the print operation only in the first image forming mode of the first image forming mode and the second image forming mode and the notification is performed, a number of accumulated prints is defined as Pf2 when the image forming apparatus executes the print operation in the first image forming mode and in the second image forming mode such that each usage ratio therein is the same on average and the notification is performed, and Pf1 and Pf2 satisfy $$Pf1 \times 0.5 < Pf2 < Pf1.$$

* * * * *